US012604181B2

(12) United States Patent
Mattsson et al.

(10) Patent No.: US 12,604,181 B2
(45) Date of Patent: Apr. 14, 2026

(54) SUBSCRIPTION CONCEALED IDENTIFIER PRIVACY

(71) Applicant: Telefonaktiebolaget LM Ericsson (publ), Stockholm (SE)

(72) Inventors: John Mattsson, Täby (SE); Prajwol Kumar Nakarmi, Sollentuna (SE); Erik Thormarker, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

(21) Appl. No.: 17/771,539

(22) PCT Filed: Oct. 29, 2020

(86) PCT No.: PCT/EP2020/080362
§ 371 (c)(1),
(2) Date: Apr. 25, 2022

(87) PCT Pub. No.: WO2021/089396
PCT Pub. Date: May 14, 2021

(65) Prior Publication Data
US 2022/0408243 A1 Dec. 22, 2022

Related U.S. Application Data

(60) Provisional application No. 62/930,188, filed on Nov. 4, 2019.

(51) Int. Cl.
| | |
|---|---|
| *H04W 12/02* | (2009.01) |
| *H04W 12/03* | (2021.01) |
| *H04W 12/40* | (2021.01) |
| *H04W 12/72* | (2021.01) |

(52) U.S. Cl.
CPC ........... *H04W 12/02* (2013.01); *H04W 12/03* (2021.01); *H04W 12/40* (2021.01); *H04W 12/72* (2021.01)

(58) Field of Classification Search
CPC . H04L 1/16; H04L 1/18; H04L 1/1812; H04L 1/1816; H04L 1/1819; H04W 52/00; H04W 52/04; H04W 52/18; H04W 52/28; H04W 52/281
See application file for complete search history.

(56) References Cited

U.S. PATENT DOCUMENTS

| | | |
|---|---|---|
| 2018/0124597 A1 | 5/2018 | Malthankar et al. |
| 2019/0098502 A1 | 3/2019 | Torvinen et al. |
| 2019/0130133 A1 | 5/2019 | Al-Kabra et al. |

FOREIGN PATENT DOCUMENTS

| | | |
|---|---|---|
| CN | 107925879 A | 4/2018 |

OTHER PUBLICATIONS

International Search Report and Written Opinion of the International Searching Authority, PCT/EP2020/080362, mailed Jan. 25, 2021, 17 pages.

(Continued)

*Primary Examiner* — Diana J. Cheng
(74) *Attorney, Agent, or Firm* — Sage Patent Group

(57) ABSTRACT

A user equipment ("UE") in a wireless communication network can generate a padded identifier by inserting a padding bitstring in a field of an identifier associated with the UE. The UE can further encrypt the padded identifier to generate a concealed padded identifier. The UE can further transmit the concealed padded identifier to a network node operating in the wireless communication network.

16 Claims, 15 Drawing Sheets

(56) References Cited

OTHER PUBLICATIONS

Apple Inc, "Introduction of the Subscription Concealed Identifier to EPC," 3GPP TSG SA WG3 (Security) Meeting #90Bis, S3-180838, Feb. 26-Mar. 2, 2018, San Diego, USA, 11 pages.

Jonsson, et al., "Public- Key Cryptography Standards (PKCS) #1: RSA Cryptography Specifications Version 2.1," Network Working Group, RSA Laboratories, Feb. 2003, 72 pages.

3rd Generation Partnership Project; "Technical Specification Group Core Network and Terminals; Numbering, addressing and identification" (Release 16), 3GPP TS 23.003, V16.0.0, Sep. 2019, Valbonne, France, 134 pages.

Qian, Y.-W., et al., "Network Steganography System Based on Multi-Agent," Journal of Nanjing University of Science and Technology (Natural Science) vol. 33, No. 3, Jun. 2009, (pp. 302-311) 6 pages. (English-Language Abstract).

Notice of Allowance mailed Feb. 16, 2026, Chinese Patent Application No. 202080077658.6, 8 pages.

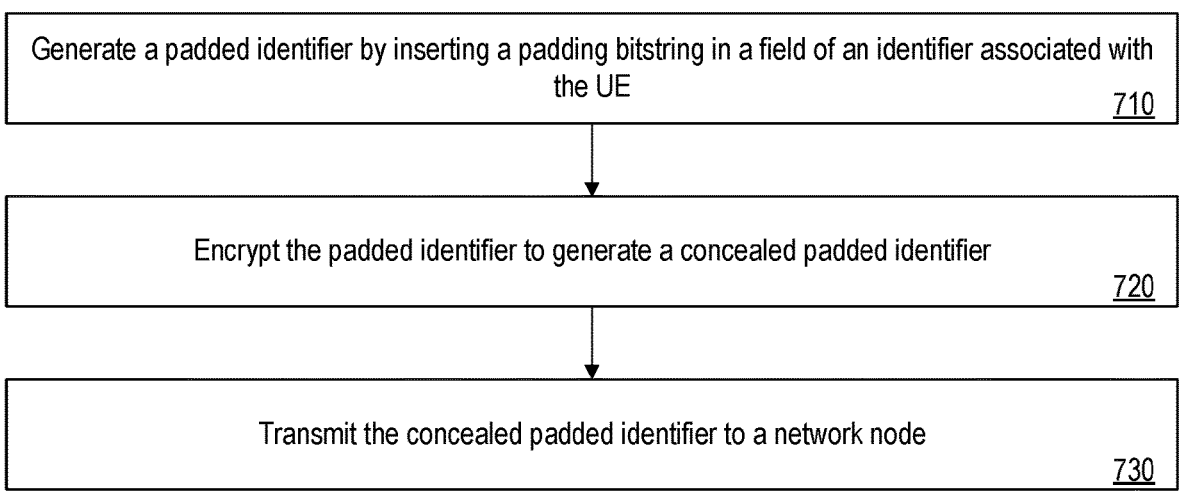

Generate a padded identifier by inserting a padding bitstring in a field of an identifier associated with the UE
710

Encrypt the padded identifier to generate a concealed padded identifier
720

Transmit the concealed padded identifier to a network node
730

FIG. 7

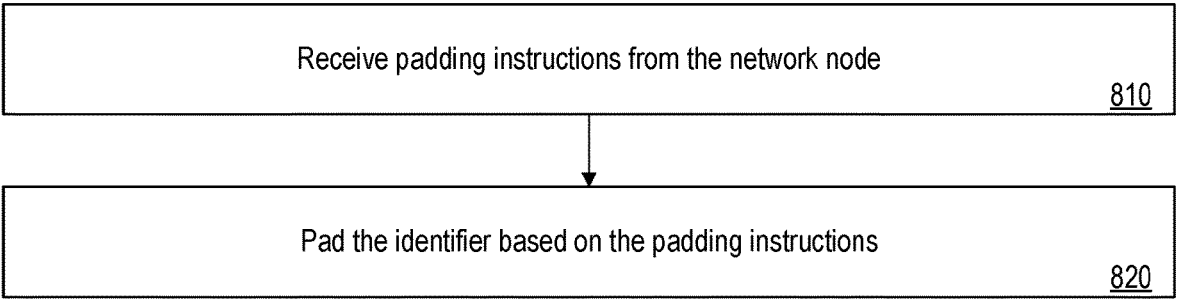

Receive padding instructions from the network node
810

Pad the identifier based on the padding instructions
820

FIG. 8

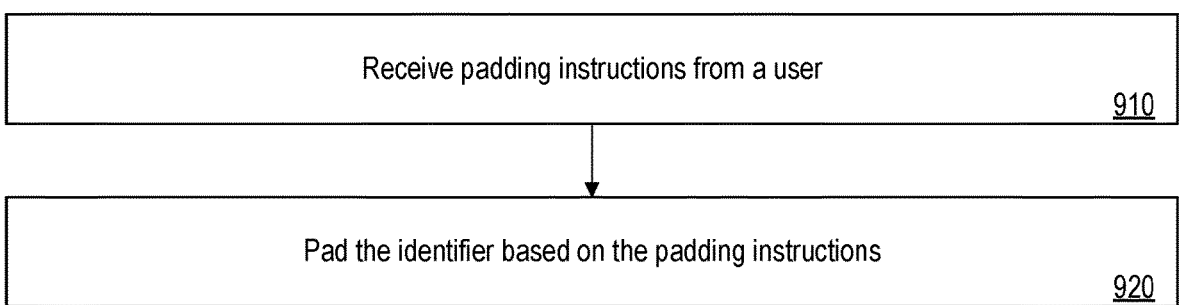

Receive padding instructions from a user
910

Pad the identifier based on the padding instructions
920

FIG. 9

| Determine that a plurality of padding bitstrings are insertable by the UE in a plurality of fields of the identifier 1410 |
| --- |
| Remove the plurality of padding bitstrings from the plurality of fields of the identifier 1442 |

| Determine only a portion of the content in the padded identifier 1542 |
| --- |
| Transmit the concealed padded identifier to a home network node in a home network 1550 |

1

SUBSCRIPTION CONCEALED IDENTIFIER PRIVACY

CROSS REFERENCE TO RELATED APPLICATIONS

This application is a 35 U.S.C. § 371 national stage application of PCT International Application No. PCT/EP2020/080362 filed on Oct. 29, 2020, which in turn claims priority to U.S. Provisional Patent Application No. 62/930, 188, filed on Nov. 4, 2019, the disclosures and content of which are incorporated by reference herein in their entireties.

TECHNICAL FIELD

The present disclosure relates generally to communication, and more particularly to operations to secure subscription concealed identifiers (SUCI), transmitted over-the-air in wireless communication networks.

BACKGROUND

A 5th Generation ("5G") wireless communication network is a next generation of mobile networks developed by a standard developing organization called the $3^{rd}$ Generation Partnership Project ("3GPP"). The earlier generations of mobile networks were called $4^{th}$ Generation ("4G")/long term evolution ("LTE"), $3^{rd}$ Generation ("3G")/universal mobile telecommunications service ("UMTS"), and $2^{nd}$ Generation ("2G")/global system for mobile communication ("GSM").

A 5G network is maintained and its services are offered by Mobile Network Operators ("MNOs"). MNOs can be distinguishable from each other by two types of codes: the Mobile Country Code ("MCC") and the Mobile Network Code ("MNC"). The "realm" can also distinguish MNOs. To use a particular 5G network offered by a particular MNO, users can be required to have a contractual relationship with that MNO. That relationship can be called the subscription. In cases when the user lacks a subscription to some particular MNO (e.g., in a so-called roaming scenario), the relationship can be achieved by roaming agreements between the MNO where the user has a subscription (e.g., the user's Home Network ("HN")), and the MNO that the user is being served (e.g., the Serving Network ("SN")). The term network can be used to mean HN or SN. The SN can also be referred to as a Visited Network or a Roaming Network.

Each subscription in a MNO's 5G network can be identified by a unique long-term identifier called a Subscription Permanent Identifier ("SUPI"). Users can wirelessly access a 5G network over-the-air using a wireless device or user equipment ("UE"). Before providing any service, a 5G network may need to identify a user (e.g., identify the user's subscription behind a UE). For this purpose of identification, UEs in earlier generation of mobile networks (e.g., 4G, 3G, and 2G) used to send users' unique long-term identifier over-the-air. This was considered a privacy issue because users could be tracked or identified by any unauthorized entity capable of intercepting message or acting as man-in-the-middle over-the-air. However, in a 5G network, each MNO has an ability to offer better privacy to its users so that their unique long-term identifiers (e.g., the users' SUPIs) are not visible over-the-air. That ability comes from a mechanism in which UEs, instead of sending SUPIs, calculate and send concealed identifiers over-the-air, which can be referred to as the subscription concealed identifier ("SUCI"). The MNO makes available to UEs all information that are necessary for the calculation of SUCI, denoted encryption parameters.

SUMMARY

According to some embodiments, a method of operating a wireless device/user equipment ("UE") in a wireless communication network is provided. The method can include generating a padded identifier by inserting a padding bitstring in a field of an identifier associated with the UE. The method can further include encrypting the padded identifier to generate a concealed padded identifier. The method can further include transmitting the concealed padded identifier to a network node operating in the wireless communication network.

According to other embodiments, a method of operating a network node in a wireless communication network is provided. The method can include determining a padding technique usable by a UE in the wireless communication network to insert a padding bitstring in a field of an identifier associated with the UE prior to the UE encrypting the identifier. The method can further include receiving a concealed padded identifier from the UE. The method can further include decrypting the concealed padded identifier to generate a padded identifier. The method can further include determining content of the identifier separate from the padding bitstring based on the padding technique.

According to other embodiments, a network node, user equipment, computer program, and/or computer program product is provided for performing one or more of the above methods, wherein the network node is a radio network node or a core network node.

Various embodiments described herein can reduce the correlation between SUPI length and SUCI length. Padding the SUPI prior to encryption can prevent identification of sensitive information based on length of the SUCI. This can significantly reduce information leakage regarding the user from the SUCI, which can make it harder for attackers to track or identify the user.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 7-9 are flow charts illustrating examples of operations performed by a UE to pad an identifier of the UE according to some embodiments of the present disclosure;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The calculation of SUCI can mean the UE encrypting the SUPI, which can be performed prior to the SUCI being transferred over-the-air between the UE and the 5G network. The encryption can be asymmetric and can use the HN's public key (denoted HN public key). The HN can make the HN public key available to the UE. There could be multiple ways of doing the asymmetric encryption of the SUPI for calculating the SUCI, these ways denoted as encryption schemes. Some examples of the encryption schemes include ElGamal encryption scheme, Elliptic Curve Integrated Encryption Scheme ("ECIES"), and Rivest-Shamir-Adleman ("RSA") encryption, as well as various quantumresistant schemes. There could also be multiple variants of the same scheme, e.g., different elliptic curves could be used with an ECIES scheme like secp256r1, secp384r1, and curve25519. There exists also a special encryption scheme named the "null-scheme." This null-scheme does not do any actual encryption, rather produces the same output as the input. It effectively means that a SUCI calculated using the "null-scheme" will comprise of the information in SUPI in clear-text over-the-air. The HN public key and the encryption scheme are two examples of encryption parameters. Other examples are, for example, length of intermediate keys, field lengths (e.g. the message authentication code ("MAC") field) and cryptographic primitives (e.g., which hash function). The term field can be used to refer to all types of information elements included in the SUPI and SUCI.

Figure 1:
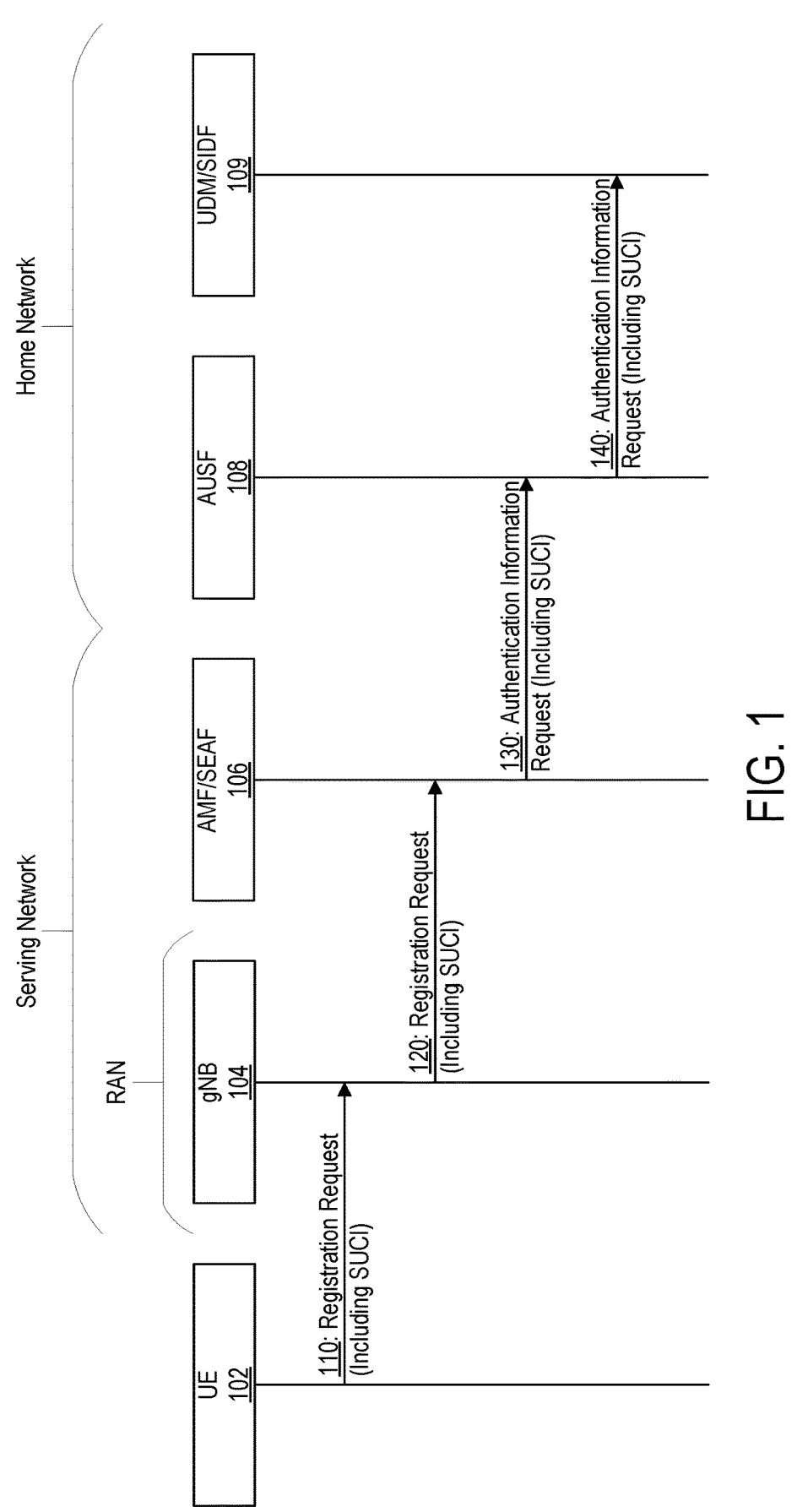
FIG. 1 is a signal flow diagram of an example of a user equipment ("UE") (also referred to herein as a wireless device) registration using a subscription concealed identifier ("SUCI") according to some embodiments of the present disclosure.

FIG. 1 is a high-level sequence diagram illustrating an example of a message flow including the SUCI. In operation 110, the UE 102 connects to a 5G radio base station ("gNB") 104 over-the-air and sends a Registration Request message that includes a SUCI calculated by the UE 102. The gNB 104 can be part of the 5G Radio Access Network ("RAN"). In operation 120, the gNB 104 forwards the received Registration Request message to a core network ("CN") node. The core network node in FIG. 1 is illustrated as an Access and Mobility Management Function ("AMF") or Security Anchor Function ("SEAF") interchangeably. The gNB 104 and AMF/SEAF 106 can be collectively denoted as a Serving Network ("SN"). The SEAF further locates the Authentication Server Function ("AUSF") 108. The SEAF 106 then creates and sends to the AUSF 108 in operation 130 a 5G Authentication Information Request ("AIR") that among other information can include the received SUCI. The AUSF 108 then contacts the Unified Data Management ("UDM") or Subscription Identifier De-concealing Function ("SIDF") 109 in operation 140. The AUSF 108 and UDFM/SIDF 109 can be collectively denoted as a Home Network ("HN").

In case of roaming the SN and the HN belong to different MNOs while otherwise both the SN and HN belong to the same MNO. Registration can include more operations than the messages shown in FIG. 1. FIG. 1 illustrates an example of how the SUCI travels over the network. Further details can be found in 3GPP TS 33.501 v. 16.0.0.

The above description describes wireless access to the 5G core over 3GPP 5G access. Devices may also connect to a 5G core over non-3GPP accesses that can be wireless or wired. SUCI protection is currently only defined for 5G, but the mechanisms would be similar if SUCI was defined for other generations of networks such as future 6G, 4G, 3G, and 2G.

Example definitions of SUPI can be found in 3GPP TS 23.003 v.16.0.0. Examples of the SUPI and the SUCI formats are outlined below, though the SUPI and SUCI formats may be updated in future.

The SUPI can include the following parts (shown with "||" as concatenation): SUPI type||SUPI value.

Where the SUPI value can currently be either of type international mobile subscriber identity ("IMSI") or network specific identifier (also sometimes referred to as network access identifier ("NAI")). In the future, other SUPI types may be defined. In either case, the SUPI value can include a home network identifier and a subscription identifier. The subscription identifier can be concealed in the SUCI.

If the SUPI is of type IMSI, the Home Network identifier can include a MCC and MNC and the subscription identifier can be referred to as a MSIN. Therefore, the IMSI can include the following parts (separated by ||): MCC||MNC||M-SIN.

If the SUPI is of type network specific identifier, the Home Network Identifier is generally represented by so-called "realm," and the subscription identifier is generally represented by so-called "username." Therefore, the NAI can look like: username@realm.

The SUCI can include the following parts (separated by ||): SUPI type||Home Network Identifier||other parameters||Concealed subscription identifier.

3GPP TS 33.501 v.16.0.0 specifies that for SUPIs containing IMSI, the SUCI has following fields: SUPI Type; Home Network Identifier; Routing Indicator; Protection Scheme Identifier; Home Network Public Key Identifier; and Scheme Output. The SUPI Type as defined in 3GPP TS 23.003 v.16.0.0 identifies the type of the SUPI concealed in the SUCI. The Home Network Identifier is set to the MCC and MNC of the IMSI as specified in 3GPP TS 23.003 v.16.0.0. The Routing Indicator is specified in 3GPP TS 23.003 v.16.0.0. The Protection Scheme Identifier is specified in Annex C of 3GPP TS 33.501 v.16.0.0. The Home Network Public Key Identifier is specified in 3GPP TS 33.501 v.16.0.0 and detailed in TS 23.003 v.16.0.0. The Scheme Output is specified in this document and detailed in 3GPP TS 23.003 v.16.0.0.

Further, 3GPP TS 33.501 v.16.0.0 specifies that for SUPIs containing Network Specific Identifier, the SUCI in NAI format has following fields: the realm part and the username part. The realm part of the SUCI is set to the realm part of the SUPI. The username part of the SUCI is formatted as specified in 3GPP TS 23.003 v.16.0.0 using the SUPI Type, Routing Indicator, the Protection Scheme Identifier, the Home Network Public Key Identifier and the Scheme Output.

3GPP TS 33.501 v.16.0.0 has specified 3 standardized concealment schemes identifiers: Null-scheme; Profile A (based on Elliptic Curve Integrated Encryption Scheme (ECIES) and uses Curve25519); and Profile B (also based on ECIES and uses secp256r1).

Further, 3GPP TS 33.501 v.16.0.0 has reserved 9 placeholders for identifying concealment schemes to be standardized in future. Furthermore, it has reserved 4 placeholders for identifying proprietary concealment schemes.

Figure 2:
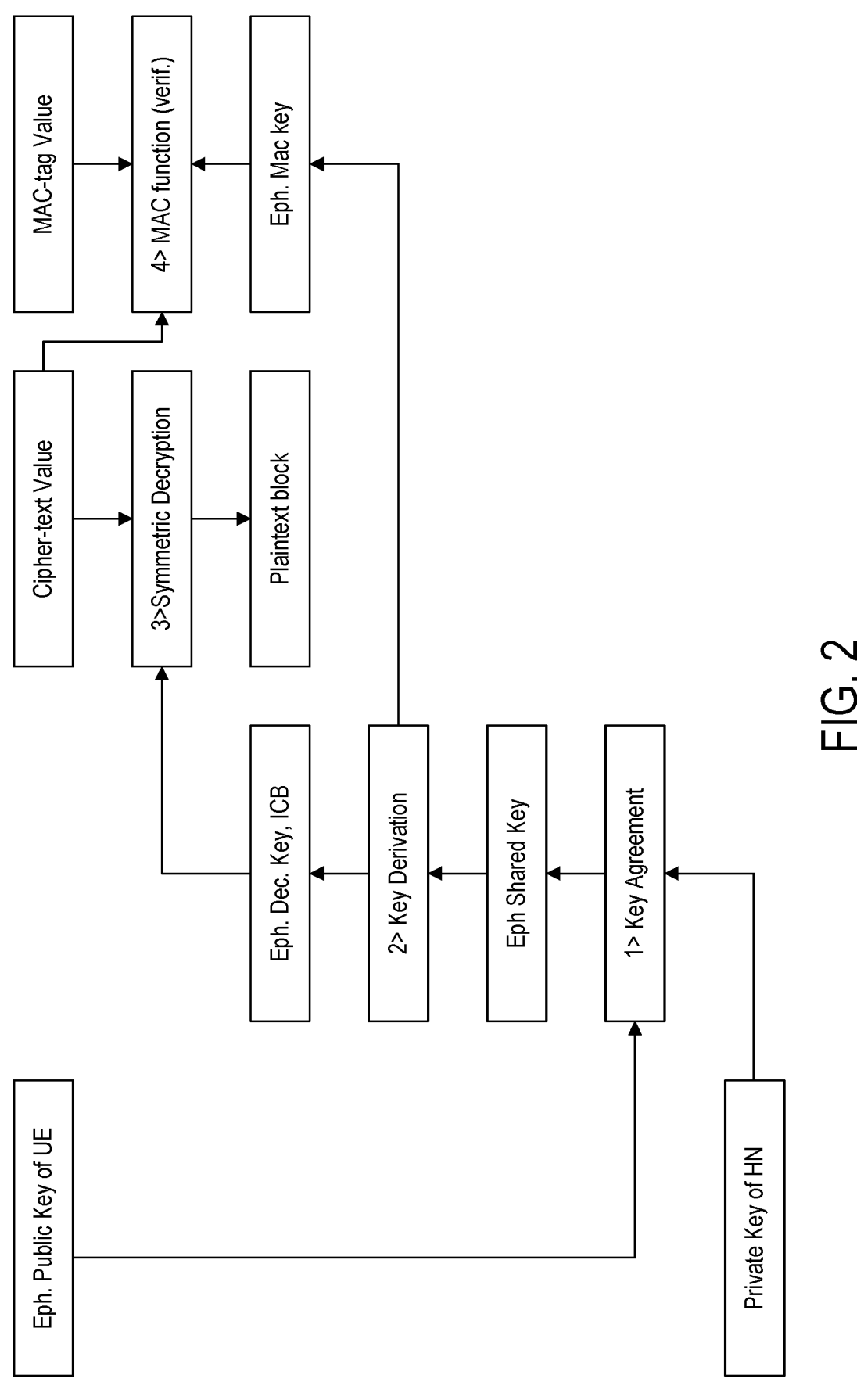
FIG. 2 is a block diagram illustrating an example of elliptic curve integrated encryption scheme ("ECIES") based encryption at a UE according to some embodiments of the present disclosure.

FIG. 2 illustrates an example of the ECIES based encryption at the UE, as presented in Figure C.3.2-1 of the 3GPP TS 33.501 v.16.0.0. 3GPP TS 33.501 v.16.0.0 specifies the size of the output from these concealment schemes. For the Null-scheme, the size of output is equal to the size of input. For the Profile A, the size of output is equal to the total of 256-bit public key, 64-bit MAC, plus size of input. For the Profile B, the size of output is equal to the total of 264-bit public key, 64-bit MAC, plus size of input. For proprietary schemes, the maximum size of output is total of 3000 octets plus size of input. The size of input in the above mean the size of username used in case of NAI format or MSIN in case of IMSI.

Figure 4:
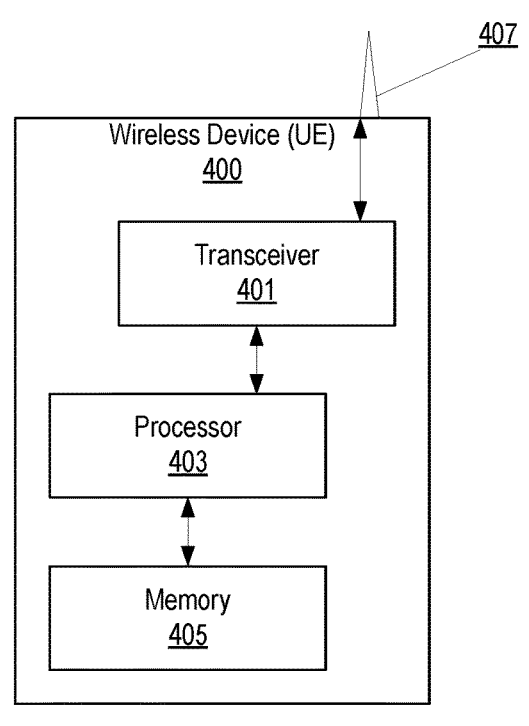
FIG. 4 is a block diagram illustrating an example of a UE according to some embodiments of the present disclosure.
Figure 16:
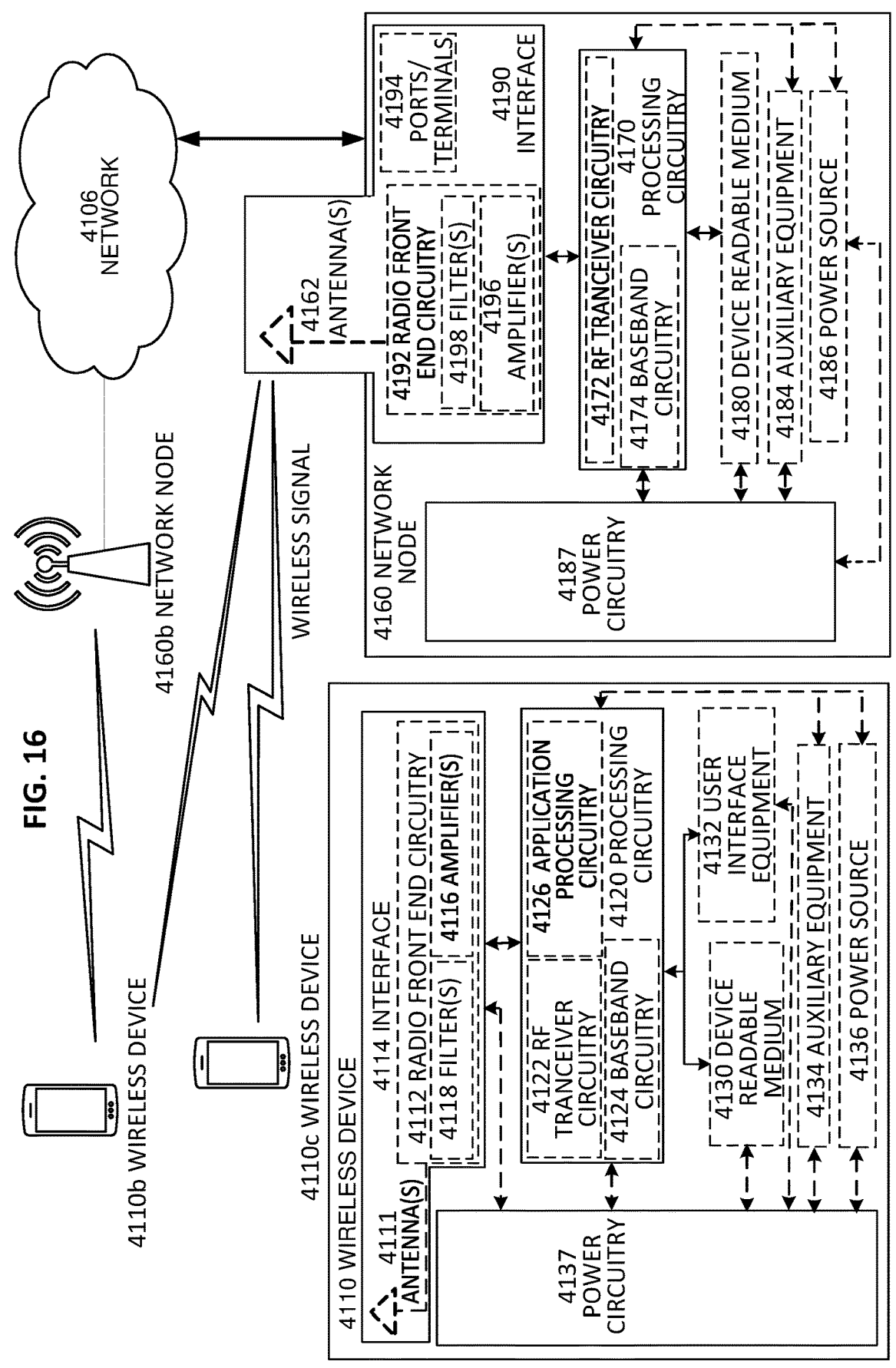
FIG. 16 is a block diagram of a wireless network in accordance with some embodiments.

The term UE is used herein without loss of generality. The UE refers to several parts or components that altogether enables the users of the UE to access the services provided by the network. On a high level, it can include at least the Universal Subscriber Identity Module ("USIM") and the Mobile Equipment ("ME"). Examples of a UE are illustrated in FIGS. 4 and 16 and further described below.

SUCI was designed to conceal the privacy sensitive information, for example, subscription identifier (e.g., MSIN or username). However, there are still security risks with some mechanisms to calculate SUCI (e.g., as standardized by 3GPP, see said 3GPP TS 33.501 v.16.0.0) that could cause privacy sensitive information to leak from the SUCI.

In some examples, SUCI only encrypts the part of the SUPI that identifies the user and not any other parts such as information elements that identify the home network (e.g., MCC, MNC, or realm). This can result in information regarding the SUPI leaking. Furthermore, different SUPI types can include different information elements. Therefore, how privacy sensitive these parts or the SUPI are depends on where the SUCI is used. If only a small subset of users at a location use a particular information element (e.g., MCC, MNC, or realm) it may help an attacker to track and/or identify specific users.

In some examples, SUCI directly or indirectly reveals user specific information, for example, the length of plaintext (e.g., MSIN or username) or the length or content of public key (e.g., the HN could provision special public key for certain users) or the special routing identifier or the special scheme identifier. New fields may be added to SUCI which can also directly or indirectly reveal user specific information. Therefore, information regarding the SUPI can leak. The implications of such revelation could be minimal or disastrous depending upon how helpful they are to the attacker. For example, if only a small subset of users at a location have plaintexts of a specific length (e.g. MSIN or username) it may be used by an attacker to track and or identify a specific user.

In some examples, the MSIN is fixed to 9 or 10 digits in a single MNC. This means that if the MNC is transmitted in clear, the length of the MSIN does not reveal any new information to a well-informed attacker. If the MNC is encrypted between UE and SN, the length of the MSIN reveals information about the MNC. In the future longer and variable length IMSIs with new fields may be introduced. For example, the MSIN may have variable length, say, between 9 to 20 digits. In such case, the length of MSIN even after certain type of encryption could reveal subscription specific information to an attacker since certain symmetric encryption algorithms produce same length output as the input.

The usernames in NAIs belonging to a single realm, typically have variable length. In one example, a network may be provided with only two users and the following NAIs: NAI1=thanos@example.com and NAI2=theodor@example.com. Given that the SUCI protection is done with the same protection scheme the SUCIs for the two users will always have different lengths as the usernames have different lengths. Theodor's SUCIs will always be 1 byte longer than Thanos' SUCIs. An attacker with knowledge of the username distribution will therefore be able to differentiate Thanos' and Theodor's SUCIs. In practical applications the distribution may be more complicated, but the attacker may use additional information such as location and time of day to identify or track a user. Even if the attacker cannot identify the user, the attacker may be able to correlate different SUCI's from the same user with each other and use that to e.g. sell advertisement.

Various embodiments described herein enables a UE (either in USIM or in ME part of the UE) to calculate SUCI (or encrypt SUPI) in a way so that fewer fields are sent unencrypted and that less information regarding the other information elements (e.g., length of those fields) is leaking. This is achieved by enabling the UE to add padding to the fields (in the SUPI or separate from SUPI) to be encrypted, and by enabling the UE to encrypt additional information elements. The padding can be added according to several different processes, where the processes are decided by the UE (either in USIM or in ME part of the UE), by the human user, or by the network (HN or SN), or by non-human user in case of headless IoT devices, or by some automated policy, or by any entity/party belonging to 3GPP network or outside to 3GPP network.

In some embodiments, a HN and SN (or network functions in the HN/SN) can decrypt parts of the SUCI and recover the information elements without padding in the SUPI. In additional or alternative embodiments, a SN (or network functions in the SN) can provide the UE with keys for encryption of some additional information elements. In additional or alternative embodiments, a SN (or network functions in the SN) can decrypt the additional fields in the SUCI. In additional or alternative embodiments, a HN (or network functions in the HN) can ensure that the UE calculate SUCI according to HN operator preferences when it comes to padding and encryption of additional fields.

Various embodiments described herein can significantly reduce information leakage regarding the user from the SUCI. This can make it harder for attackers to track or identify the user.

In some embodiments, before encrypting parts of the SUPI, the UE can pad the information elements to be encrypted with zero or more bits of padding. The padding may be added to the end beginning or middle of a field. The padding may be added to each padded field separately or with a single padding covering several fields (e.g., one padding for all the fields in the SUPI). SUPI and SUCI can also be fields. The padding mechanism can be applied to a field before or after the field is encoded as a byte string or bit string before encryption. The padding mechanism can be deterministic, pseudo-randomized, randomized or a combination. The choice of padding mechanism may be determined for example by the UE or the HN and may depend on the type of SUPI, the length of information elements in the SUPI, statistics about the distribution of SUPIs in the HN or other operators, or on external factors such as the time of day, or the type of subscriber.

The UE may be able to include the padding while the network may be able to remove the padding after decrypting the SUCI. In some embodiments, a delimiter (e.g. the bitstring 0b0111, the character "@" or the byte value 0xFF) is used in the plaintext before being encrypted to separate the rest of the padding from the rest of the plaintext which means that the delimiter is ultimately included as encrypted in the SUCI. The padding itself can be any bitstring, e.g. a bitstring consisting or zeroes or a bitstring repeating the delimiter. This delimiter can be standardized, or dynamically decided/negotiated.

In additional or alternative embodiments, a delimiter from a set of delimiters (e.g., randomly among "@", "?", "*") may be selected by the UE. This set can be standardized or dynamically decided/negotiated.

In additional or alternative embodiments, the HN knows the exact padding mechanism used by UE (e.g. always pad 5 bytes, or alternate padding of 3 bytes and 5 bytes depending on information such as the weekday, location, or weather).

In additional or alternative embodiments, the length of the padding is included in the plaintext (e.g., padding length=3) before being encrypted which means that the length of the padding is ultimately included as encrypted in the SUCI.

In additional or alternative embodiments, two delimiters may be used to indicate the start and the end of the padding. The padding can also have some more complex pattern (e.g. the "@#€@#€@#€") that enable the HN to separate padding from the information elements. In this way, the padding can also be embedded inside the content of a field being padded.

In additional or alternative embodiments, the length of the padding is included unencrypted in the SUCI.

In additional or alternative embodiments, the delimiter is included unencrypted in the SUCI.

In some embodiments, the SUCI may include several paddings, for example, one used between UE and SN and one used between UE and HN. The SUCI may also include several paddings for different fields in the SUCI. For example, the SUCI may include separate paddings for MSIN or username, separate paddings for routing indicators, and separate paddings for public key.

A padding technique can include padding instructions that may be used to pad information elements in the SUPI. The padding instructions may indicate the length of the padding. In some examples, information elements in the SUPI can be padded with N1 number of bits, for example, the information element can be padded with addition of 256 bits. In additional or alternative examples, information elements in the SUPI can be padded with padding where a length of the padding is randomly, pseudo-randomly or deterministically chosen in the integer interval [N2, N3]. Deterministically could, for example, be a function of weekday, location, and/or weather. In additional or alternative examples, information elements in the SUPI can be padded with padding where a length of the padding is randomly, pseudo-randomly or deterministically chosen from a statistical distribution. In additional or alternative examples, information elements in the SUPI can be padded to N4 number of bits. In this example, the information element may be padded until its length becomes 256 bits in total. In other words, if the information element has length of 150 bits, then an additional 106 bits will be padded to get the total length of 256 bits. In additional or alternative examples, information elements in the SUPI can be padded to the next multiple of N5 bits. In additional or alternative examples, information elements in the SUPI can be padded to N6 bits, where N6 is randomly, pseudo-randomly or deterministically chosen from a statistical distribution. In additional or alternative examples, information elements in the SUPI can be padded to the next multiple of N7 bits, where N7 is randomly, pseudo-randomly or deterministically chosen from a statistical distribution.

In the above examples, Ni may be an integer. The above examples are not an exhaustive list. Furthermore, padding methods can be combined to get more complex padding methods. For example, information elements in the SUPI can be padded by first padding to the next multiple of 64 bits, then padding with additional padding where the length of the additional padding is randomly, pseudo-randomly or deterministically chosen from a statistical distribution. Padding processes can also be chosen probabilistically, for example with a 60 chance of using a first padding process and a 40% chance of using a second padding process.

Besides the length of padding, a padding technique can also specify the content of padding. A person skilled in the art would appreciate that the one or more examples described for the length of padding would also apply to choose the content of padding. In some example, the content of padding can use some constant like bits of 1s or bits of 0s. In additional or alternative examples, the content of padding can use some constant 8-bit character for all the multiple of 8 bits and fill the rest with bits of 1s, e.g., if the length of padding is 20 bits, then a first 8 bits could be a character 'A', the second 8 bits could also be a character 'A', and the remaining 4 bits could be four bits of 1 s. In additional or alternative examples, the content of padding can use random or pseudo-random or deterministic bits or numbers. In additional or alternative examples, the content of padding can use the same character or bit string as was used for a delimiter.

Besides the length and the content of padding, a padding technique can also indicate which information elements are padded. For example, any combination of MSIN, username, routing identifier, public key identifier, and scheme identifier can be padded as well as other existing or new fields.

An example of a SUCI without padding and with padding is provided below.

Assuming the IMSI 234150999999999, where MCC=234, MNC=15 and MSIN=0999999999, the Routing Indicator 678, and a Home Network Public Key Identifier of 27, the NAI format for the SUCI conceptually takes the following forms.

Without padding for the Profile A protection scheme:

type0.rid678.schid1.hnkey27.ecckey<ECC ephemeral public key>.cip<encryption of byteencode (0999999999)>.mac<MAC tag value> where byte-encode is a function that encodes MSIN as a byte string. The byte-encode function could be, for example, bcd encoding. This is a conceptual example, byte-encode may be some other function in a relevant 3GPP standard.

With padding for the Profile A protection scheme:

type0.rid678.schid1.hnkey27.ecckey<ECC ephemeral public key>.cip< encryption of byte-encode (0999999999)||0xFF||0x00|| . . . ||0x00>.mac<MAC tag value> where 0xFF||0x00|| . . . ||0x00 is a byte string that is Ni/8 bytes long, where Ni is the padding length in bits (which happens to always be a multiple of 8 in this example). In this particular example 0xFF is used as delimiter and is assumed to be a byte value that is not contained in any byte string that is in the range of the byte-encode function. Further, byte 0x00 is used in rest of padding.

Assuming the Network Specific Identifier user17@example.com, the Routing Indicator 678, and a Home Network Public Key Identifier of 27, the NAI format for the SUCI conceptually takes the following forms.

For the Profile A protection scheme:

type1.rid678.schid1.hnkey27.ecckey<ECC ephemeral public key>.cip< encryption of byte-encode (user17)>.mac<MAC tag value>@example.com where byte-encode is a function that encodes username as a byte string. The byte-encode function could be e.g. ascii encoding with a 0 leading bit. This is a conceptual example, byte-encode may be some other function in a relevant 3GPP standard.

With padding for the Profile A protection scheme:

type1.rid678.schid1.hnkey27.ecckey<ECC ephemeral public key>.cip<encryption of byte-encode (user17@@ . . . @)>mac<MAC tag value>@example.com where "@@ . . . @" is a character string that adds Ni/8 to the length in bytes of byte-encode (user17@@ . . . @) compared to byte-encode(user17), where Ni is the padding length in bits (which happens to always be a multiple of 8 in this example). In this particular example @ is used as delimiter with assumption that it is a character that is not contained in any username. Further, character @ is used in rest of padding.

In some embodiments, the UE chooses or decides the padding technique. This choice of decision could be based on some information that it has or obtains from somewhere else.

In additional or alternative embodiments, the HN chooses or decides the padding technique. The HN may have more information regarding the distribution of username lengths in its subscriber database (like HSS or UDM) and therefore, the HN may be able to make better padding decisions than the UE. To enable the HN to decide the padding technique used by the UE the HN may configure the UE to use a specific padding technique. The configuration of the padding technique can either be preconfigured in the UE (UICC or ME) or be provisioned/downloaded at a later point in time. This provision/download at later time could be done using some signaling like Radio Resource Control (RRC) protocol, or Non-access Stratum (NAS) protocol. The configuration can either be that the HN chooses from a list of preconfigured padding techniques or that the HN configures a script that calculates the padding length based on a set of input parameters. Example of input parameters are information about user's subscription, user's preferences, and operator's policy.

In additional or alternative embodiments, a user of the UE can choose a padding technique. This would mean that a human user or a non-human user chooses a padding technique.

In additional or alternative embodiments, the SN chooses the padding technique. The SN could then indicate the choice to UE and/or HN by using signaling like Radio Resource Control ("RRC") protocol, Non-access Stratum ("NAS") protocol, HTTP protocol, some other protocol that runs over IP, or some other protocol that can be used in service based interface ("SBI").

In additional or alternative embodiments, a network function, entity, or party inside or outside the 3GPP network chooses the padding technique. Examples can include external authentication authorization and accounting ("AAA") servers dedicated network functions to handle the padding, or existing network functions like subscription identifier de-concealing function ("SIDF"). This network function, entity, or party can then indicate the choice to the UE and/or the SN and/or the HN by using signaling like a RRC protocol, NAS protocol, HTTP protocol, some other protocol that runs over IP, or some other protocol that can be used in the SBI.

In some embodiments, the UE can encrypt information elements (e.g. the realm, MCC, and/or MNC, even MSIN or username, or other information like routing identifier, public key, and scheme identifier) that are included in the SUCI in a way so that SN can decrypt. The UE can get the encryption key from the SN or from the HN. The protection can be done with a symmetric key or a public/private key pair. The encryption key can be preconfigured in the UE (UICC or ME) or be downloaded at a later point in time. In additional or alternative embodiments, the encryption key can be distributed in NAS, AS, HTTP, or some other protocols. In the case where the additionally encrypted information elements are the realm, MCC, and/or MNC, the SN can use the decrypted information to route the message to the HN.

In some embodiments, The UE-SN encryption may include padding as described in the above in addition to the padding used in UE-HN encryption. The UE-SN encryption may be done in parallel to the UE-HN SUPI encryption or after. In the first case, the two ciphertexts would be sent to the SN. In the second case, the UE-HN ciphertext would be included in the plaintext of the UE-SN encryption. The SN may forward the information it gets from the UE unencrypted or it may decrypt and construct a SUCI that is sent to the HN.

Figure 3:
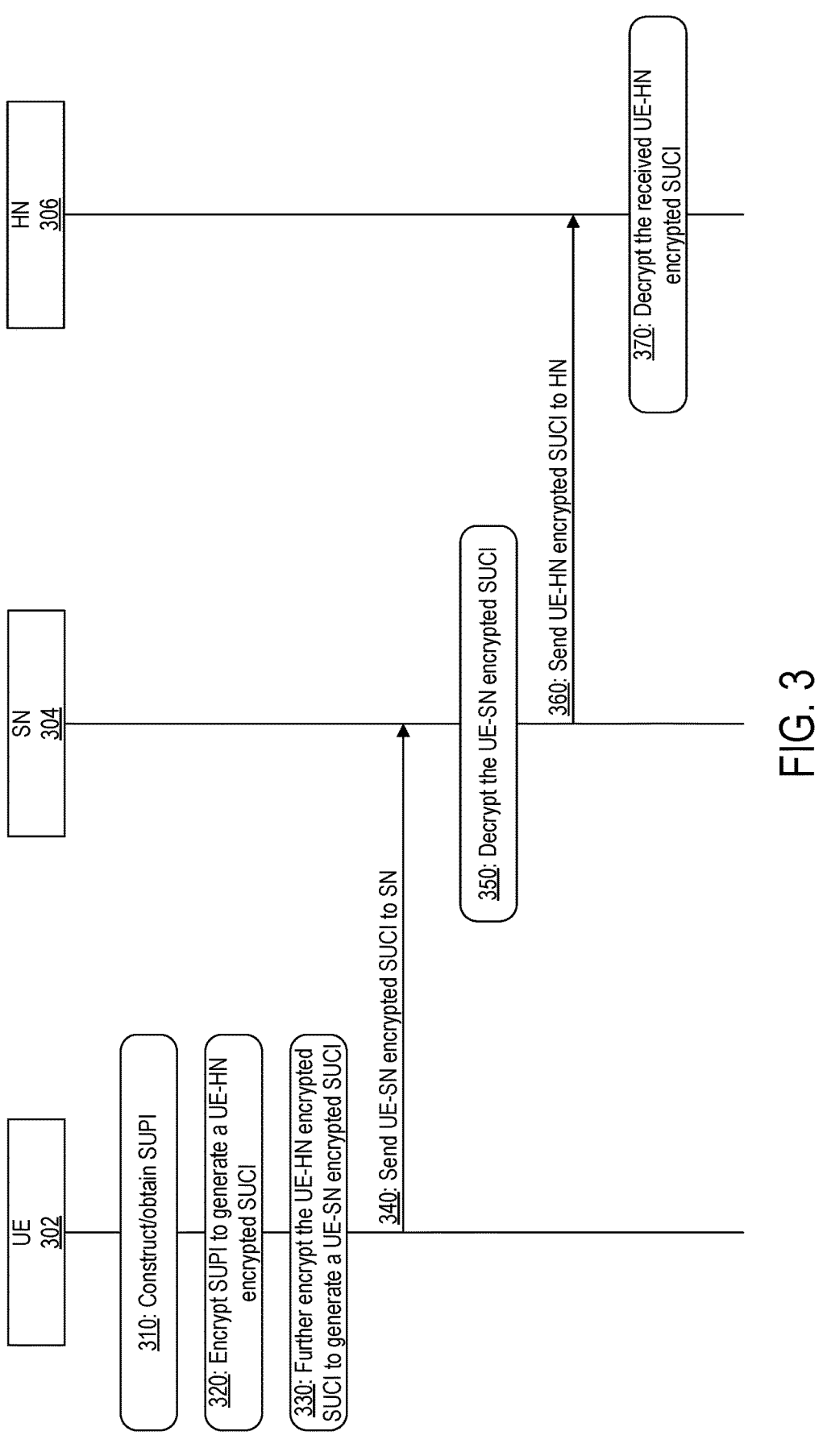
FIG. 3 is a signal flow diagram illustrating an example of UE-serving network ("SN") encrypted SUCI according to some embodiments of the present disclosure.

FIG. 3 illustrates an example in which the UE-SN encryption is done after the UE-HN SUPI encryption and the SN decrypts and constructs a SUCI that is sent to the HN.

At operation 310, the UE 302 constructs and/or obtains a SUPI. At operation 320, the UE 302 encrypts SUPI to generate a UE-HN encrypted SUCI. In some embodiments, the UE 302 encrypts the SUPI with a key that the HN can retrieve. At operation 330, the UE 302 further encrypts the UE-HN encrypted SUCI to generate a UE-SN encrypted SUCI. In some embodiments the UE 302 further encrypts the UE-HN encrypted SUCI with a key that the SN can retrieve.

In some embodiments, the UE-SN encrypted SUCI can include the following parts (shown with "||" as concatenation): parameters||ciphertext. The parameters can be a set of unencrypted fields like an identifier for the encryption key, identifier for the encryption algorithms, and input to the encryption algorithm (e.g., random numbers). The ciphertext can be the encryption of the SUCI with a symmetric or public key encryption algorithm, for example E (key, SUCI). The encryption algorithms may include integrity protection and the ciphertext may be longer than the SUCI.

At operation 340, the UE 302 sends the UE-SN encrypted SUCI to SN 306. At operation 350, the SN 304 decrypts the UE-SN encrypted SUCI. In some embodiments, the SN 304 obtains decrypted fields including a UE-HN encrypted SUCI. In additional or alternative embodiments, the SN construct/enrich (e.g., add some fields to) the UE-HN encrypted SUCI.

At operation 360, the SN 304 sends the UE-HN encrypted SUCI to the HN 306. At operation 370, the HN 306 decrypts the received UE-HN encrypted SUCI.

In some embodiments, a padding technique can include padding instructions indicating that a delimiter is inserted into a field of an identifier and then k bytes of padding are inserted where k is randomly chosen in [0, n] for some positive integer n. When padding is randomly chosen to have length 0, only the delimiter is added. Otherwise padding is randomly chosen to have non-zero length. In some examples, the delimiter can be considered part of the padding such that when a delimiter is use the padding is always at least one bit.

In some embodiments, when the user/subscription identifier has variable length, then the network (home or serving) can assign a fixed length identifier anyway by already adding a padding. For example, if there are two users and their usernames are ABC (length 3) and QRST (length 4), then the network could already assign the fixed length usernames as ABC0000000 (length 10) and QRST000000 (length 10). Doing so would be a pre-padding done by the network. This would mean that IMSI and NAI when provisioned in UE (USIM, simcard, or mobile phones), those identifiers are already padded. The UE may not need to perform anything extra from what it already does to produce SUCI today.

In some embodiments, SUCI can be calculated by both USIM and mobile phone. When a mobile phone calculates SUCI, it may ask for a SUPI from a USIM. In the future, when padding is used, old mobile may not know how to do padding even if the USIM does. So, when a mobile phone is calculating a SUCI and asks for a SUPI from a USIM, then the USIM can return the padded SUPI (padded MSIN or padded username) to the mobile phones. In this way mobile phones would not need to perform anything extra from what it already does to produce SUCI today.

In some embodiments, both USIM and mobile phones may not have implemented new padding techniques for padding identifiers. In that case, the network could regularly update the identifier (e.g., using over the air (OTA) updates, remote file management, etc.) so that USIM or mobile phones would not need to perform anything extra from what it already does to produce SUCI today.

FIG. 4 is a block diagram illustrating elements of a wireless device UE 400 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 400 may be provided, for example, as discussed below with respect to wireless device 4110 of FIG. 16.) As shown, wireless device UE may include an antenna 407 (e.g., corresponding to antenna 4111 of FIG. 16), and transceiver circuitry 601 (also referred to as a transceiver, e.g., corresponding to interface 4114 of FIG. 16) including a transmitter and a receiver configured to provide uplink and downlink radio communications with a base station(s) (e.g., corresponding to network node 4160 of FIG. 16) of a radio access network. Wireless device UE may also include processing circuitry 403 (also referred to as a processor, e.g., corresponding to processing circuitry 4120 of FIG. 16) coupled to the transceiver circuitry, and memory circuitry 405 (also referred to as memory, e.g., corresponding to device readable medium 4130 of FIG. 16) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that separate memory circuitry is not required. Wireless device UE may also include an interface (such as a user interface) coupled with processing circuitry 403, and/or wireless device UE may be incorporated in a vehicle.

As discussed herein, operations of wireless device UE may be performed by processing circuitry 403 and/or transceiver circuitry 401. For example, processing circuitry 403 may control transceiver circuitry 401 to transmit communications through transceiver circuitry 401 over a radio interface to a radio access network node (also referred to as a base station) and/or to receive communications through transceiver circuitry 401 from a RAN node over a radio interface. Moreover, modules may be stored in memory circuitry 405, and these modules may provide instructions so that when instructions of a module are executed by processing circuitry 403, processing circuitry 403 performs respective operations.

Figure 5:
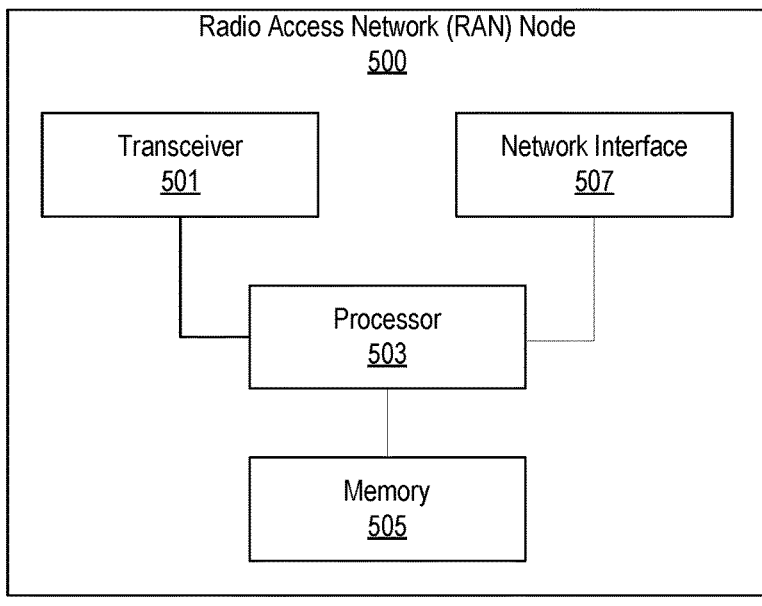
FIG. 5 is a block diagram illustrating an example of a radio access network ("RAN") node (e.g., a base station eNB/gNB) according to some embodiments of the present disclosure.

FIG. 5 is a block diagram illustrating elements of a radio access network RAN node 500 (also referred to as a network node, base station, eNodeB/eNB, gNodeB/gNB, etc.) of a Radio Access Network (RAN) configured to provide cellular communication according to embodiments of inventive concepts. (RAN node 500 may be provided, for example, as discussed below with respect to network node 4160 of FIG. 16.) As shown, the RAN node may include transceiver circuitry 501 (also referred to as a transceiver, e.g., corresponding to portions of interface 4190 of FIG. 16) including a transmitter and a receiver configured to provide uplink and downlink radio communications with mobile terminals. The RAN node may include network interface circuitry 507 (also referred to as a network interface, e.g., corresponding to portions of interface 4190 of FIG. 16) configured to provide communications with other nodes (e.g., with other base stations) of the RAN and/or core network CN. The network node may also include a processing circuitry 503 (also referred to as a processor, e.g., corresponding to processing circuitry 4170) coupled to the transceiver circuitry, and a memory circuitry 505 (also referred to as memory, e.g., corresponding to device readable medium 4180 of FIG. 16) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the RAN node may be performed by processing circuitry 503, network interface 507, and/or transceiver 501. For example, processing circuitry 503 may control transceiver 501 to transmit downlink communications through transceiver 501 over a radio interface to one or more mobile terminals UEs and/or to receive uplink communications through transceiver 501 from one or more mobile terminals UEs over a radio interface. Similarly, processing circuitry 503 may control network interface 507 to transmit communications through network interface 707 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 6:
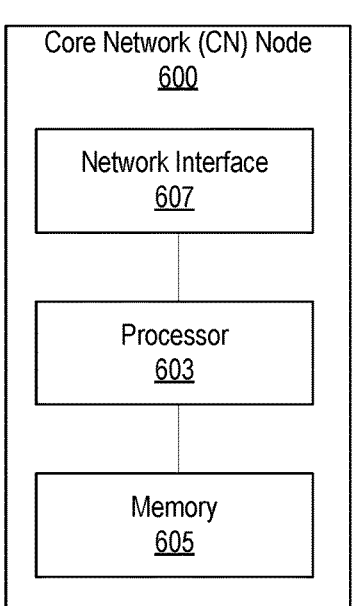
FIG. 6 is a block diagram illustrating an example of a core network ("CN") node (e.g., an AMF node, an SMF node, an OAM node, etc.) according to some embodiments of the present disclosure.

FIG. 6 is a block diagram illustrating elements of a core network CN node 600 (e.g., an SMF node, an AMF node, etc.) of a communication network configured to provide cellular communication according to embodiments of inventive concepts. As shown, the CN node 600 may include network interface circuitry 607 (also referred to as a network interface) configured to provide communications with other nodes of the core network and/or the radio access network RAN. The CN node 600 may also include a processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the CN node 600 may be performed by processing circuitry 603 and/or network interface circuitry 607. For example, processing circuitry 603 may control network interface circuitry 607 to transmit communications through network interface circuitry 607 to one or more other network nodes and/or to receive communications through network interface circuitry from one or more other network nodes. Moreover, modules may be stored in memory 605, and these modules may provide instructions so that when instructions of a module are executed by processing circuitry 603, processing circuitry 603 performs respective operations.

As discussed herein, operations of the UE 400 may be performed by processing circuitry 403 and/or transceiver 401. For example, processing circuitry 403 may control transceiver 401 to transmit communications via antenna 407 to one or more network nodes and/or to receive communications via antenna 407 from one or more network nodes. Moreover, modules may be stored in memory 405, and these modules may provide instructions so that when instructions of a module are executed by processing circuitry 403, processing circuitry 403 performs respective operations.

Operations of UE 400 will now be discussed with reference to FIGS. 7-9 according to some embodiments of inventive concepts. For example, modules (also referred to as units) may be stored in memory 405 of FIG. 4, and these modules may provide instructions so that when the instructions of a module are executed by processor 403, processor 403 performs respective operations of the flow charts of FIGS. 7-9.

FIGS. 7-9 depicts a flow chart illustrating an example of a process for operating a UE 400 that is operating in a wireless communication network.

In FIG. 7, at block 710, processor 403 generates a padded identifier by inserting a padding bitstring in a field of an identifier associated with the UE. The padding bitstring may include one or more bits. In some embodiments, the identifier can be a subscription permanent identifier, SUPI. The SUPI can include at least one of a MSIN, a username, a routing identifier, a public key identifier, and a scheme identifier.

In some embodiments, processor 403 may generate the padded identifier based on padding instructions. In FIG. 8, at block 810, processor 403 receives, via transceiver 401, the padding instructions from a network node and at block 820, processor 403 pads the identifier based on the padding instructions. In FIG. 9, processor 403 receives, via a user interface, the padding instructions from a user and at block 820, processor 403 pads the identifier based on the padding instructions.

In some embodiments, generating the padded identifier includes inserting a delimiter before or after the padding bitstring. The delimiter can be a predetermined bitstring that separates the padding bitstring from content of the identifier. In additional or alternative embodiments, the delimiter includes a first delimiter and a second delimiter and inserting the delimiter includes inserting the first delimiter before the padding bitstring and inserting the second delimiter after the padding bitstring. In additional or alternative embodiments, the padding bitstring includes one or more of the predetermined bitstring that form the delimiter and/or the delimiter itself.

In some embodiments, at least one of a length and content of the padding bitstring is determined dynamically by processor 403 based on a variable condition. Examples of the variable condition can include the date, the time, a location of the UE, or a weather of the environment of the UE.

At block 720, processor 403 encrypts the padded identifier to generate a concealed padded identifier. In some embodiments, the concealed padded identifier is a subscription concealed identifier, SUCI At block 730, processor 403 transmits, via transceiver 401, the concealed padded identifier to a network node (e.g., RAN node 500 or CN node 600). In some embodiments, processor 403 transmits the concealed padded identifier to the network node during operation of the UE for registration of the UE with the wireless communication network. In additional or alternative embodiments, the processor 403 receives a request from the network node for the identifier and the processor 403 transmits the concealed padded identifier in response to receiving the request.

In some embodiments, the wireless communication network is a home network and the network node is a home network node. In additional or alternative embodiments, the wireless communication network is a serving network and the network node is a serving network node.

Various operations of FIGS. 7-9 may be optional with respect to some embodiments. For example, regarding Embodiment 1, blocks 810 and 820 of FIG. 8; and blocks 910 and 920 of FIG. 9 may be optional.

Operations of RAN node 500 will now be discussed with reference to FIGS. 10-15 according to some embodiments of inventive concepts. For example, modules (also referred to as units) may be stored in memory 505 of FIG. 5, and these modules may provide instructions so that when the instructions of a module are executed by processor 503, processor 503 performs respective operations of the flow charts of FIGS. 10-15.

Figure 10:
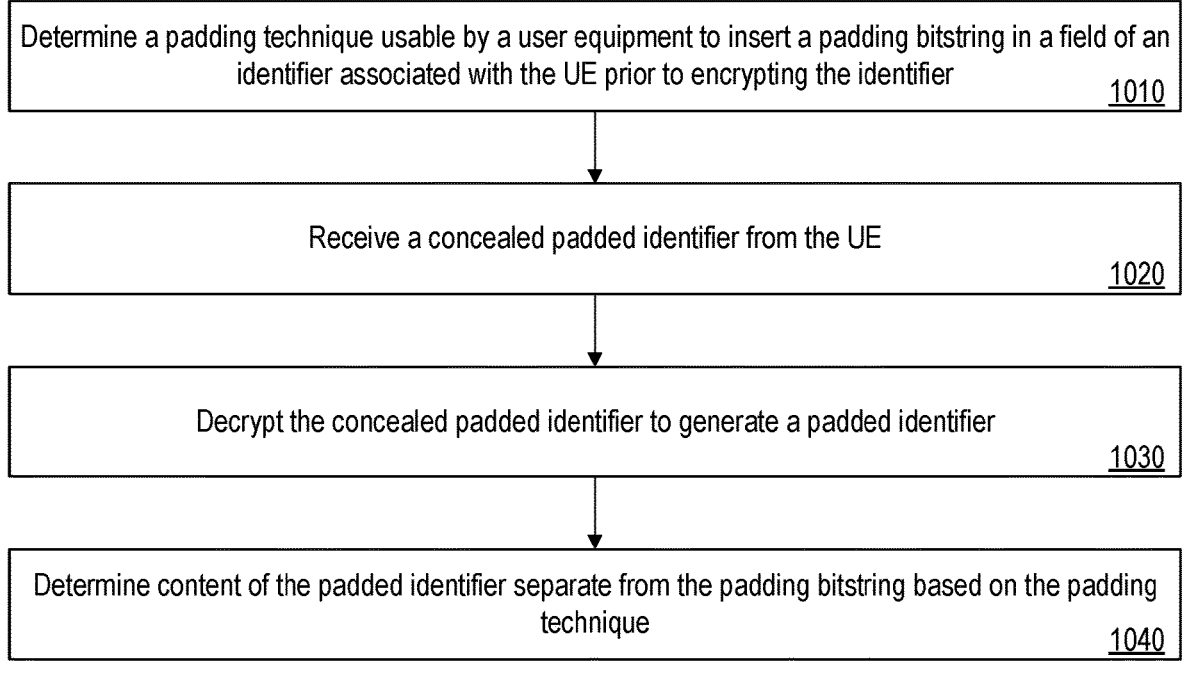
FIGS. 10-15 are flow charts illustrating examples of operations performed by a network node to receive a padded identifier of a UE according to some embodiments of the present disclosure.

In FIG. 10, at block 1010, processor 503 determines a padding technique usable by a user equipment to insert a padding bitstring in a field of an identifier associated with the UE (e.g., UE 400) prior to encrypting the identifier. The padding bitstring can include one or more bits. In some embodiments, the identifier is a subscription permanent identifier, SUPI, including at least one of a MSIN; a username, a routing identifier, a public key identifier, and a scheme identifier.

In some embodiments, processor 503 receives padding instructions informing the network node of the padding technique used by the UE. In additional or alternative embodiments, the processor 503 transmits the padding technique to the UE prior to receiving the concealed padded identifier from the UE.

At block 1020, processor 503 receives, via transceiver 501, a concealed padded identifier from the UE. In some embodiments, the concealed padded identifier is a subscription concealed identifier, SUCI. In additional or alternative embodiments, the concealed padded identifier is received from the UE during a registration process or in response to a request for the identifier transmitted by the network node.

At block 1030, processor 503 decrypts the concealed padded identifier to generate a padded identifier.

At block 1040, processor 503 determines content of the padded identifier separate from the padding bitstring based on the padding technique.

In some embodiments, determining the content of the padded identifier is based on the padding technique determined in block 1010. FIGS. 11-14 illustrate some specific examples.

Figure 11:
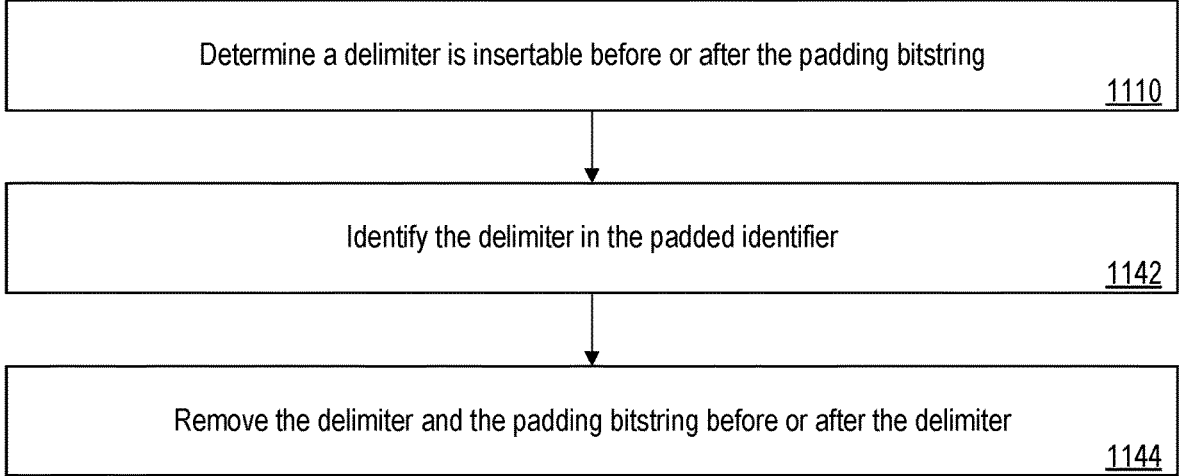

In FIG. 11, at block 1110, processor 503 determines a delimiter is insertable before or after the padding bitstring. At block 1142, processor 503 identifies the delimiter in the padded identifier. At block 1144, processor 503 removes delimiter and the padding bitstring before or after the delimiter.

Figure 12:
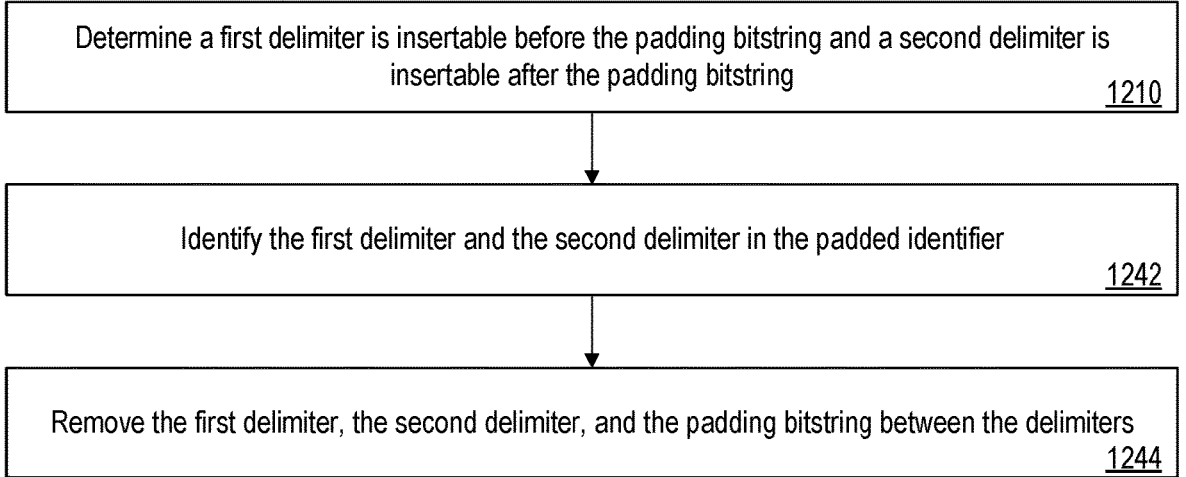

In FIG. 12, at block 1210, processor 503 determines a first delimiter is insertable before the padding bitstring and a second delimiter is insertable after the padding bitstring. At block 1242, processor 503 identifies the first delimiter and the second delimiter in the padded identifier. At block 1244, processor 503 removes the first delimiter, the second delimiter, and the padding bitstring between the delimiters.

Figure 13:
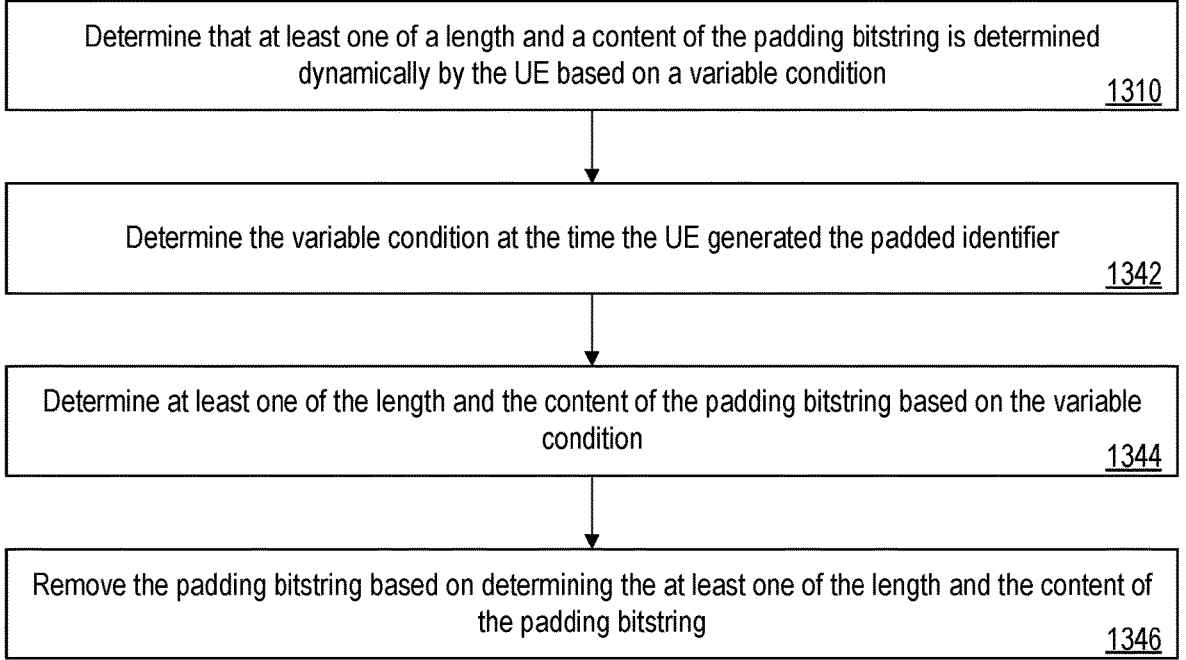

In FIG. 13, at block 1310, processor 503 determines that at least one of a length and a content of the padding bitstring is determined dynamically by the UE based on a variable condition. At block 1342, processor 503 determines the variable condition at the time the UE generated the padded identifier. At block 1344, processor 503 determines at least one of the length and the content of the padding bitstring based on the variable condition. At block 1346, processor 503 removes the padding bitstring based on determining the at least one of the length and the content of the padding bitstring.

Figure 14:
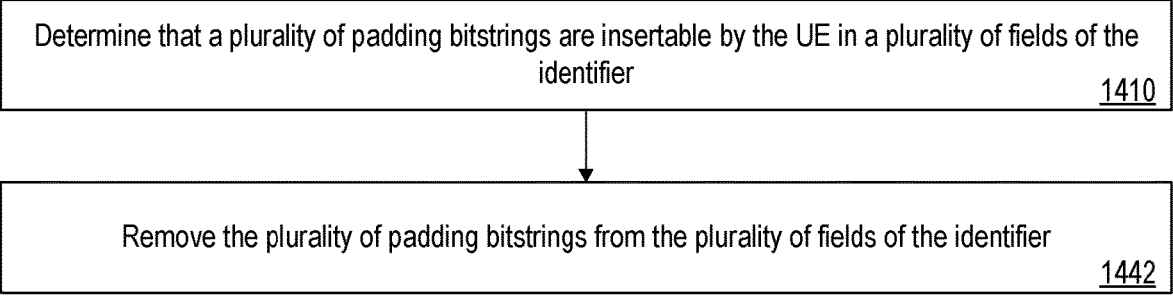

In FIG. 14, at block 1410, processor 503 determines that a plurality of padding bitstrings are insertable by the UE in a plurality of fields of the identifier. At block 1442, processor 503 removes the plurality of padding bitstrings from the plurality of fields of the identifier.

Figure 15:
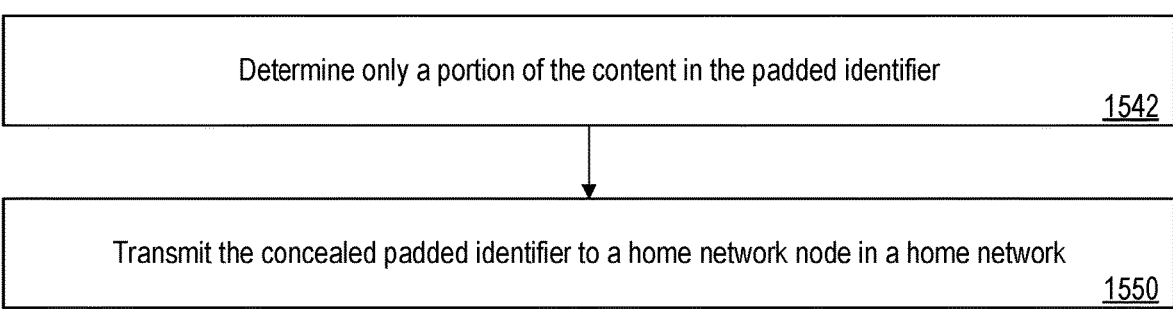

In some embodiments, the network node is an SN node. In FIG. 15, at block 1542, processor 503 may determine only a portion of the content in the padded identifier. At block 1544, processor 503 may transmit the concealed padded identifier to a HN node in a HN.

Although FIGS. 10-15 are described above in regards to RAN node 500, the operations may be performed by CN node 600. Furthermore, some of the operations illustrated in FIGS. 10-15 can be performed by any suitable HN node or SN node.

Various operations of FIGS. 10-15 may be optional with respect to some embodiments. For example, in regards to Embodiment 17, blocks 1110, 1142, and 1144 of FIG. 11; blocks 1210, 1242, and 1244 of FIG. 12; blocks 1310, 1342, 1344, and 1346 of FIG. 13; blocks 1410 and 1442 of FIG. 14; and blocks 1542 and 1550 of FIG. 15 may be optional.

Example Embodiments are discussed below. Reference numbers/letters are provided in parenthesis by way of example/illustration without limiting example embodiments to particular elements indicated by reference numbers/letters.

Embodiment 1. A method of operating a user equipment, UE, in a wireless communication network, the method comprising:

generating (710) a padded identifier by inserting a padding bitstring in a field of an identifier associated with the UE;

encrypting (720) the padded identifier to generate a concealed padded identifier; and transmitting (730) the concealed padded identifier to a network node operating in the wireless communication network.

Embodiment 2. The method of Embodiment 1, wherein the UE comprises at least one of a universal subscriber identity module, USIM, and a mobile equipment, ME, wherein the padding bitstring comprises one or more bits, wherein the identifier is a subscription permanent identifier, SUPI, and wherein the concealed padded identifier is a subscription concealed identifier, SUCI.

Embodiment 3. The method of Embodiment 2, wherein the SUPI comprises at least one of: a mobile subscriber identification number, MSIN; a username; a routing identifier; a public key identifier; and a scheme identifier, and wherein generating the padded identifier comprises padding at least one of: the MSIN; the username; the routing identifier; the public key identifier; and the scheme identifier.

Embodiment 4. The method of any of Embodiments 1-3, wherein generating the padded identifier comprises inserting a delimiter before or after the padding bitstring, the delimiter being a predetermined bitstring that separates the padding bitstring from content of the identifier.

Embodiment 5. The method of Embodiment 4, wherein the delimiter comprises a first delimiter and a second delimiter, and wherein inserting the delimiter comprises inserting the first delimiter before the padding bitstring and inserting the second delimiter after the padding bitstring.

Embodiment 6. The method of any of Embodiments 4-5, wherein the padding bitstring comprises one or more of the predetermined bitstring that form the delimiter.

Embodiment 7. The method of any of Embodiments 1-6, further comprising determining at least one of a length and content of the padding bitstring dynamically based on a variable condition.

Embodiment 8. The method of any of Embodiment 7, wherein the variable conditions comprise at least one of a date, a time, a location of the UE, and a weather of an environment of the UE.

Embodiment 9. The method of any of Embodiments 1-8, wherein generating a padded identifier comprises inserting a plurality of padding bitstrings in a plurality of fields of the identifier.

Embodiment 10. The method of any of Embodiments 1-9, wherein transmitting the concealed padded identifier to the network node operating in the wireless communication network comprises transmitting the concealed padded identifier to the network node operating in the wireless communication network during operation by the UE for registration of the UE with the wireless communication network.

Embodiment 11. The method of any of Embodiments 1-10, further comprising receiving a request for the identifier from the network node, wherein transmitting the concealed padded identifier to the network node operating in the wireless communication network comprises transmitting the concealed padded identifier to the network node operating in the wireless communication network in response to receiving the request from the network node.

Embodiment 12. The method of any of Embodiments 1-11, wherein generating the padded identifier comprises:

receiving (810) padding instructions from the network node, the padding instructions indicating at least one of: a length, a content, or a delimiter usable by the UE to pad the identifier; and padding (820) the identifier based on the padding instructions.

Embodiment 13. The method of any of Embodiments 1-12, wherein generating the padded identifier comprises:

receiving (910) padding instructions from a user of the UE via a user interface of the UE, the padding instructions indicating at least one of: a length, a content, or a delimiter usable by the UE to pad the identifier; and padding (920) the identifier based on the padding instructions.

Embodiment 14. The method of any of Embodiments 1-13, wherein the wireless communication network comprises a home network and the network node is a home network node.

Embodiment 15. The method of any of Embodiments 1-13, wherein the wireless communication network comprises a serving network and the network node is a serving network node.

Embodiment 16. The method of any of Embodiments 1-13, wherein the wireless communication network comprises a home network and a serving network and the network node comprises a home network node and a serving network node, and wherein transmitting the concealed padded identifier to the network node comprises transmitting the concealed padded identifier to the serving network node to be partially decrypted and further transmitted by the serving network node to the home network node to be further decrypted.

Embodiment 17. A method of operating a network node in a wireless communication network, the method comprising:

determining (1010) a padding technique usable by a user equipment, UE, in the wireless communication network to insert a padding bitstring in a field of an identifier associated with the UE prior to the UE encrypting the identifier;

receiving (1020) a concealed padded identifier from the UE;

decrypting (1030) the concealed padded identifier to generate a padded identifier; and determining (1040) content of the identifier separate from the padding bitstring based on the padding technique.

Embodiment 18. The method of Embodiment 17, wherein the UE comprises at least one of a universal subscriber identity module, USIM, and a mobile equipment, ME, wherein the padding bitstring comprises one or more bits, wherein the identifier is a subscription permanent identifier, SUPI, and wherein the concealed padded identifier is a subscription concealed identifier, SUCI.

Embodiment 19. The method of Embodiment 18, wherein the SUPI comprises at least one of: a mobile subscriber identification number, MSIN; a username; a routing identifier; a public key identifier; and a scheme identifier, and wherein determining the content of the identifier comprises determining at least one of: the MSIN; the username; the routing identifier; the public key identifier; and the scheme identifier.

Embodiment 20. The method of any of Embodiments 17-19, wherein determining the padding technique comprises determining (1110) a delimiter that is insertable before or after the padding bitstring, the delimiter being a predetermined bitstring that separates the padding bitstring from content of the identifier, and wherein determining the content of the identifier comprises:

identifying (1142) the delimiter in the padded identifier; and removing (1144) the delimiter and the padding bitstring before or after the delimiter.

Embodiment 21. The method of Embodiment 20, wherein determining the padding technique comprises determining (1210) that the delimiter comprises a first delimiter and a second delimiter, wherein the first delimiter is insertable before the padding bitstring and the second delimiter is insertable after the padding bitstring, and wherein determining the content of the identifier comprises:

identifying (1242) the first delimiter and the second delimiter in the padded identifier; and removing (1244) the first delimiter, the second delimiter, and the padding bitstring between the first delimiter and the second delimiter.

Embodiment 22. The method of any of Embodiments 20-21, wherein determining the padding technique comprises determining that the padding bitstring comprises one or more of the predetermined bitstring.

Embodiment 23. The method of any of Embodiments 17-22, wherein determining the padding technique comprises determining (1310) that at least one of a length and a content of the padding bitstring is determined dynamically by the UE based on a variable condition, and wherein determining the content of the identifier comprises:

determining (1342) the variable condition at a time the UE generated the padded identifier;

determining (1344) at least one of the length and the content of the padding bitstring based on the variable condition at the time the UE generated the padded identifier; and removing (1346) the padding bitstring based on determining the at least one of the length and the content of the padding bitstring.

Embodiment 24. The method of any of Embodiments 17-23, wherein determining the padding technique comprises determining (1410) a plurality of padding bitstrings insertable by the UE in a plurality of fields of the identifier, and wherein determining the content of the identifier comprises removing (1442) the plurality of padding bitstrings from the plurality of fields of the identifier.

Embodiment 25. The method of any of Embodiments 17-24, further comprising transmitting, responsive to determining the padding technique and prior to receiving the concealed padded identifier, padding instructions to the UE informing the UE of the padding technique.

Embodiment 26. The method of any of Embodiments 17-24, wherein determining the padding technique comprises receiving padding instructions informing the network node of the padding instructions usable by the UE.

Embodiment 27. The method of any of Embodiments 17-26, wherein receiving the concealed padded identifier from the UE comprises receiving the concealed padded identifier from the UE as part of a registration request by the UE to join the wireless communication network.

Embodiment 28. The method of any of Embodiments 17-26, further comprising transmitting a request to the UE for the identifier, wherein receiving the concealed padded identifier from the UE comprises receiving the concealed padded identifier from the UE in response to transmitting the request to the UE.

Embodiment 29. The method of any of Embodiments 17-28, wherein the wireless communication network comprises a home network and the network node is a home network node.

Embodiment 30. The method of Embodiment 29, wherein determining content of the identifier separate from the padding bitstring based on the padding technique comprises determining (1542) only a portion of the content in the padded identifier, the method further comprising transmitting (1550) the concealed padded identifier to a serving network node in a serving network.

Embodiment 31. The method of any of Embodiments 17-28, wherein the wireless communication network comprises a serving network and the network node is a serving network node.

Embodiment 32. A user equipment, UE, (400) operating in a wireless communication network comprising:

processing circuitry (403); and memory (405) coupled to the processing circuitry and having instructions stored therein that are executable by the processing circuitry to cause the UE to perform operations comprising:

generating (710) a padded identifier by inserting a padding bitstring in a field of an identifier associated with the UE;

encrypting (720) the padded identifier to generate a concealed padded identifier; and transmitting (730) the concealed padded identifier to a network node operating in the wireless communication network.

Embodiment 33. The UE of Embodiment 32, wherein the operations further comprise any of the operations of Embodiments 2-16.

Embodiment 34. A user equipment, UE, (400) operating in a wireless communication network and adapted to perform operations comprising:

generating (710) a padded identifier by inserting a padding bitstring in a field of an identifier associated with the UE;

encrypting (720) the padded identifier to generate a concealed padded identifier; and transmitting (730) the concealed padded identifier to a network node operating in the wireless communication network.

Embodiment 35. The UE of Embodiment 34, further configured to perform any of the operations of Embodiments 2-16.

Embodiment 36. A computer program comprising program code to be executed by processing circuitry (403) of a user equipment, UE, (400) operating in a wireless communication network, whereby execution of the program code causes the UE to perform operations, the operations comprising:

generating (710) a padded identifier by inserting a padding bitstring in a field of an identifier associated with the UE;

encrypting (720) the padded identifier to generate a concealed padded identifier; and transmitting (730) the concealed padded identifier to a network node operating in the wireless communication network.

Embodiment 37. The computer program of Embodiment 36, the operations further comprising any of the operations of Embodiments 2-16.

Embodiment 38. A computer program product comprising a non-transitory storage medium including program code to be executed by processing circuitry (403) of a user equipment, UE, (400) operating in a wireless communication network, whereby execution of the program code causes the UE to perform operations comprising:

generating (710) a padded identifier by inserting a padding bitstring in a field of an identifier associated with the UE;

encrypting (720) the padded identifier to generate a concealed padded identifier; and transmitting (730) the concealed padded identifier to a network node operating in the wireless communication network.

Embodiment 39. The computer program product of Embodiment 38, the operations further comprising any of the operations of Embodiments 2-16.

Embodiment 40. A network node (500, 600) operating in a wireless communication network, the network node comprising:

processing circuitry (503, 603); and memory (505, 605) coupled to the processing circuitry having instructions stored therein that are executable by the processing circuitry to cause the network node to perform operations comprising:

determining (1010) a padding technique usable by a user equipment, UE, in the wireless communication network to insert a padding bitstring in a field of an identifier associated with the UE prior to the UE encrypting the identifier;

receiving (1020) a concealed padded identifier from the UE;

decrypting (1030) the concealed padded identifier to generate a padded identifier; and determining (1040) content of the identifier separate from the padding bitstring based on the padding technique.

Embodiment 41. The network node of Embodiment 40, the operations further comprising any of the operations of Embodiments 18-31.

Embodiment 42. A network node (500, 600) operating in a wireless communication network, the network node adapted to perform operations comprising:

determining (1010) a padding technique usable by a user equipment, UE, in the wireless communication network to insert a padding bitstring in a field of an identifier associated with the UE prior to the UE encrypting the identifier;

receiving (1020) a concealed padded identifier from the UE;

decrypting (1030) the concealed padded identifier to generate a padded identifier; and determining (1040) content of the identifier separate from the padding bitstring based on the padding technique.

Embodiment 43. The network node of Embodiment 42, the operations further comprising any of the operations of Embodiments 18-31.

Embodiment 44. A computer program comprising program code to be executed by processing circuitry (503, 603) of a network node (500, 600) operating in a wireless communication network, whereby execution of the program code causes the network node to perform operations, the operations comprising:

determining (1010) a padding technique usable by a user equipment, UE, in the wireless communication network to insert a padding bitstring in a field of an identifier associated with the UE prior to the UE encrypting the identifier;

receiving (1020) a concealed padded identifier from the UE;

decrypting (1030) the concealed padded identifier to generate a padded identifier; and determining (1040) content of the identifier separate from the padding bitstring based on the padding technique.

Embodiment 45. The computer program of Embodiment 44, the operations further comprising any of the operations of Embodiments 18-31.

Embodiment 46. A computer program product comprising a non-transitory storage medium including program code to be executed by processing circuitry (503, 603) of a network node (500, 600) operating in a wireless communication network, whereby execution of the program code causes the network node to perform operations comprising:

determining (1010) a padding technique usable by a user equipment, UE, in the wireless communication network to insert a padding bitstring in a field of an identifier associated with the UE prior to the UE encrypting the identifier;

receiving (1020) a concealed padded identifier from the UE;

decrypting (1030) the concealed padded identifier to generate a padded identifier; and determining (1040) content of the identifier separate from the padding bitstring based on the padding technique.

Embodiment 47. The computer program product of Embodiment 46, the operations further comprising any of the operations of Embodiments 18-31.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 16 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signaling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 16 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 17:
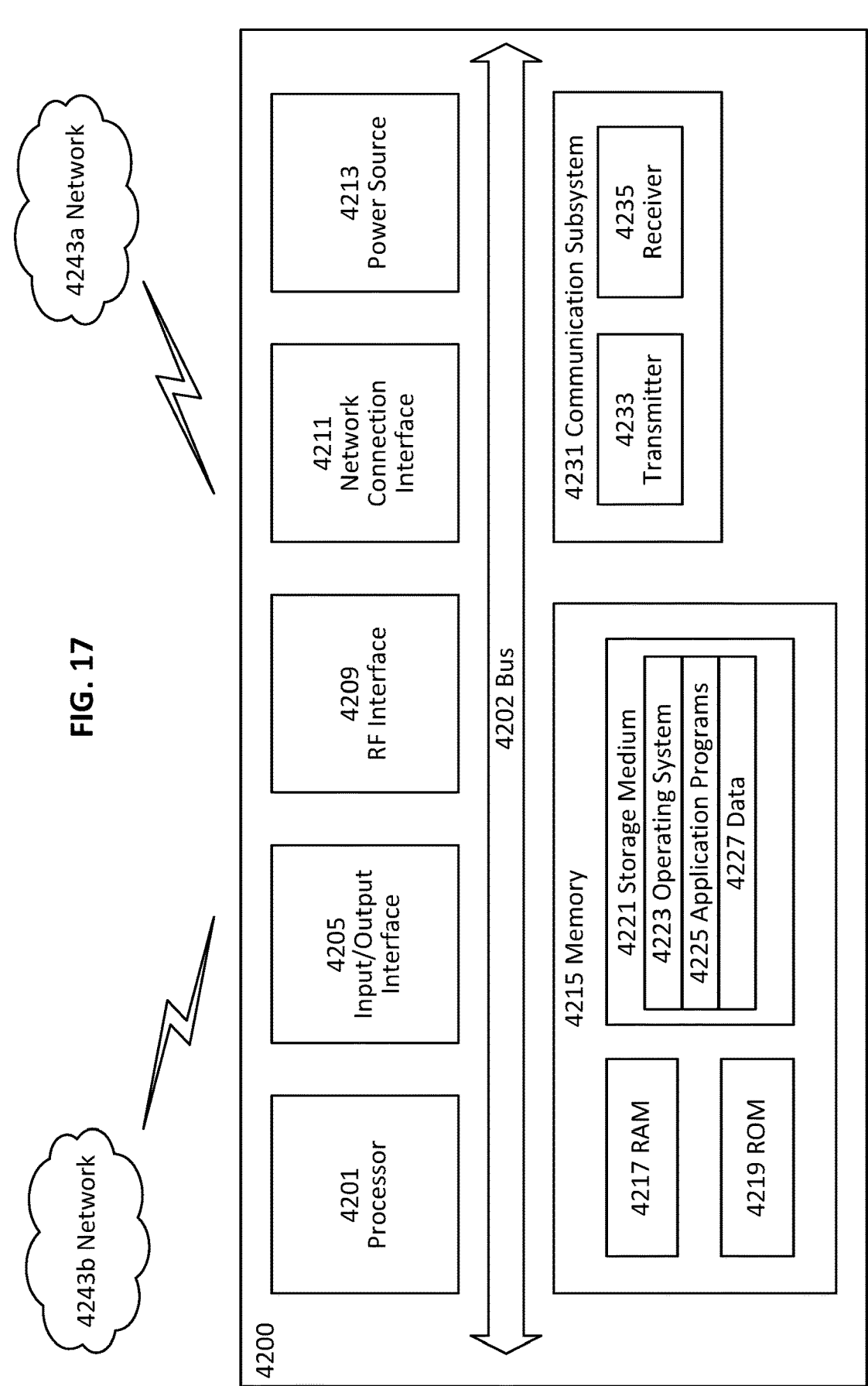
FIG. 17 is a block diagram of a user equipment in accordance with some embodiments

FIG. 17 illustrates a user Equipment in accordance with some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 17, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 17 is a UE, the components discussed herein are equally applicable to a WD, and vice-versa.

In FIG. 17, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 17, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 18:
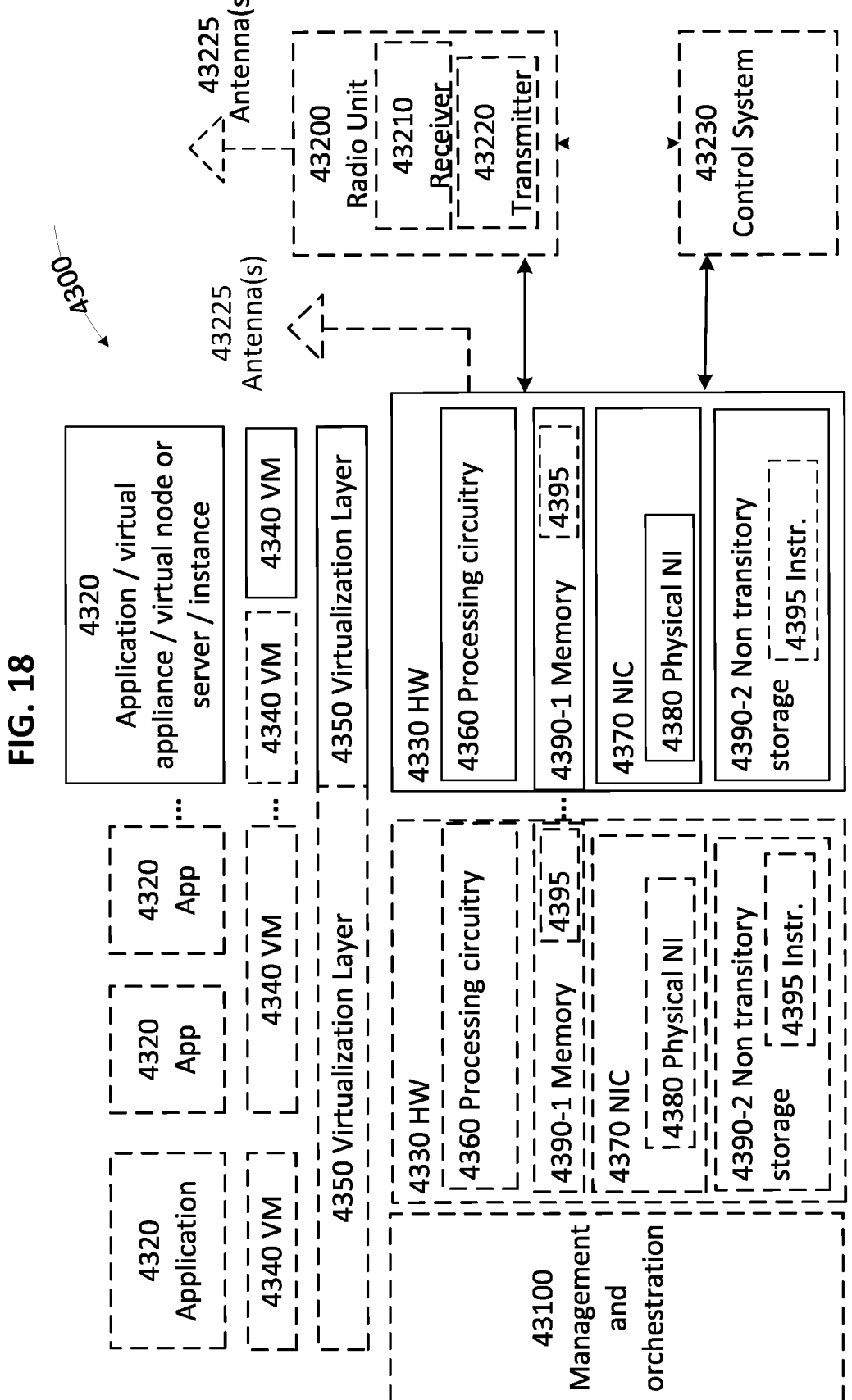
FIG. 18 is a block diagram of a virtualization environment in accordance with some embodiments.

FIG. 18 illustrates a virtualization environment in accordance with some embodiments.

FIG. 18 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 18, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 18.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected affected with the use of control system 43230 which may alternatively be used for communication between the hardware nodes 4330 and radio units 43200.

Figure 19:
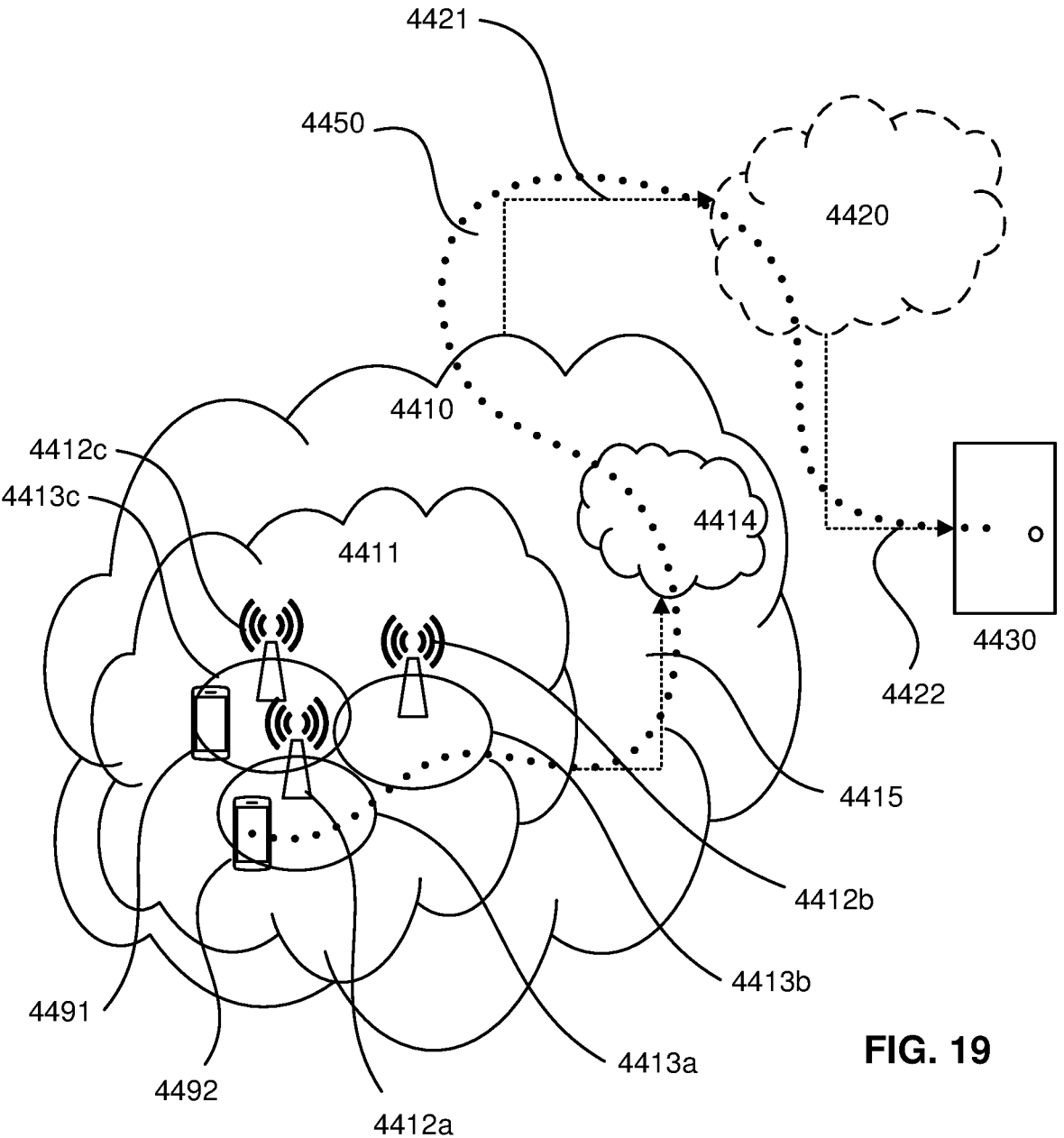
FIG. 19 is a block diagram of a telecommunication network connected via an intermediate network to a host computer in accordance with some embodiments.

FIG. 19 illustrates a telecommunication network connected via an intermediate network to a host computer in accordance with some embodiments.

With reference to FIG. 19, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 19 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 20:
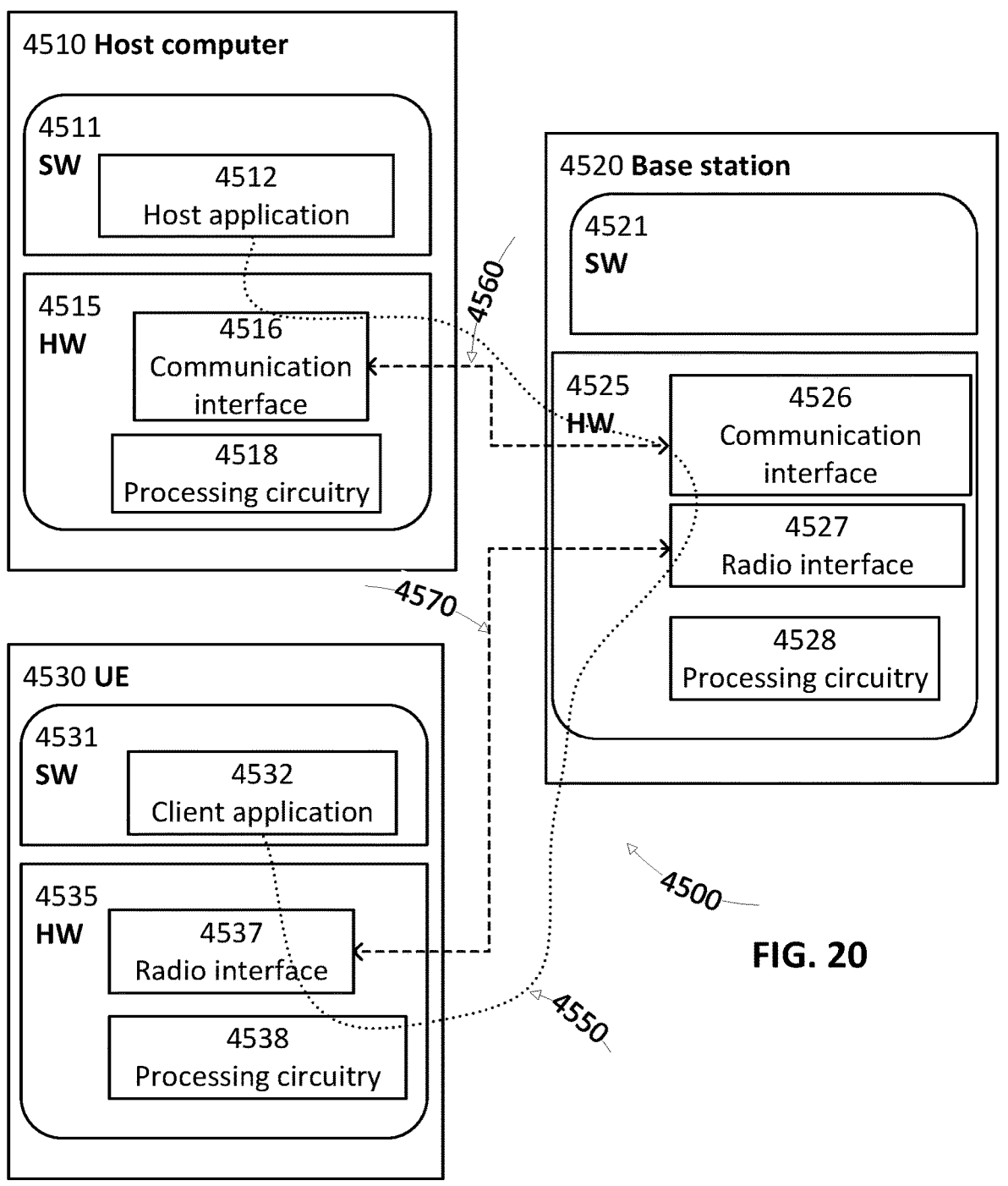
FIG. 20 is a block diagram of a host computer communicating via a base station with a user equipment over a partially wireless connection in accordance with some embodiments.

FIG. 20 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 20. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 20) served by base station 4520. Communication interface 4526 may be configured to facilitate connection 4560 to host computer 4510. Connection 4560 may be direct or it may pass through a core network (not shown in FIG. 20) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 20 may be similar or identical to host computer 4430, one of base stations 4412a, 4412b, 4412c and one of UEs 4491, 4492 of FIG. 19, respectively. This is to say, the inner workings of these entities may be as shown in FIG. 20 and independently, the surrounding network topology may be that of FIG. 19.

In FIG. 20, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 21, 22:
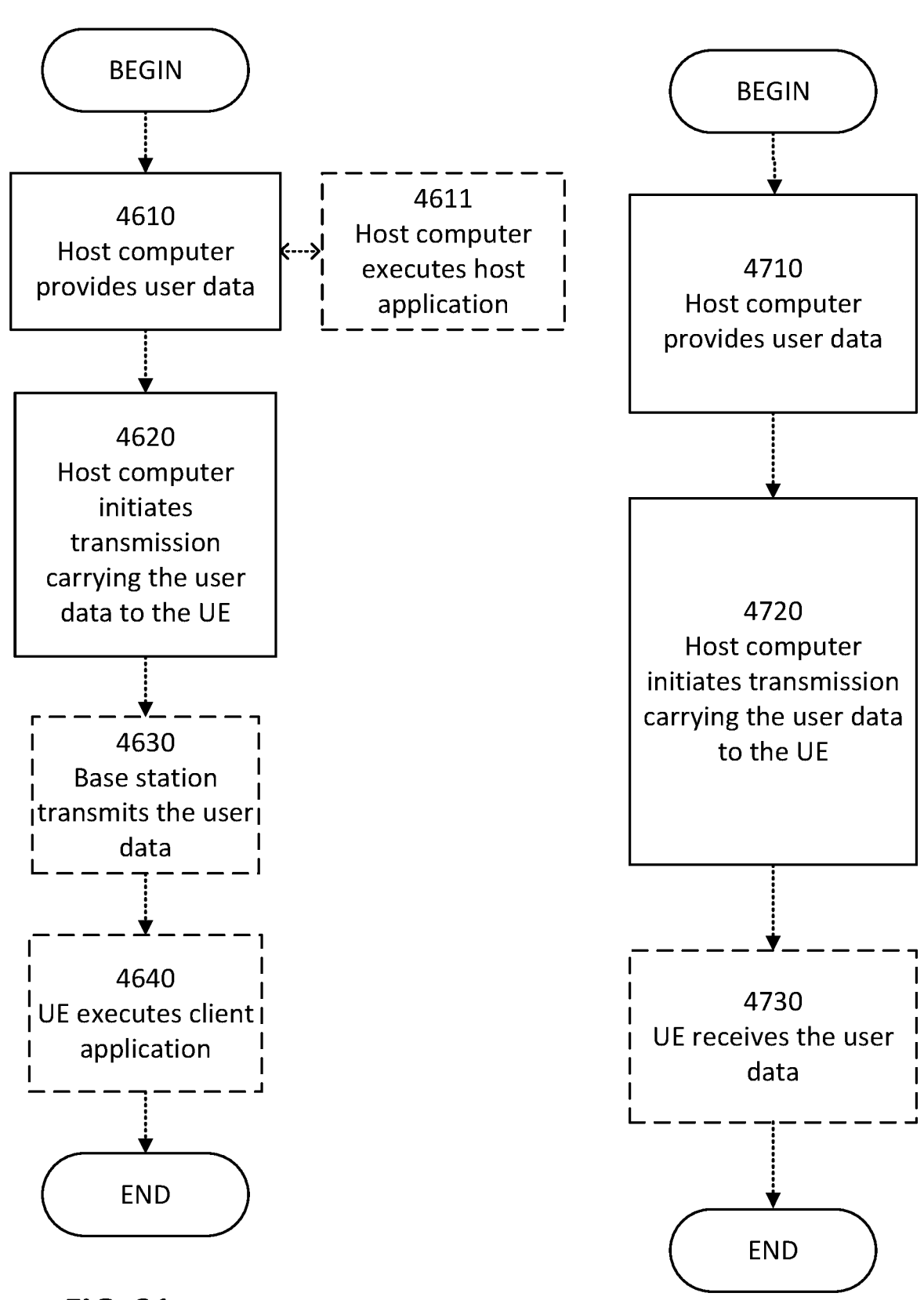
FIG. 21 is a block diagram of methods implemented in a communication system including a host computer, a base station, and a user equipment in accordance with some embodiments.
FIG. 22 is a block diagram of methods implemented in a communication system including a host computer, a base station, and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 21 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 22 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figures 23, 24:
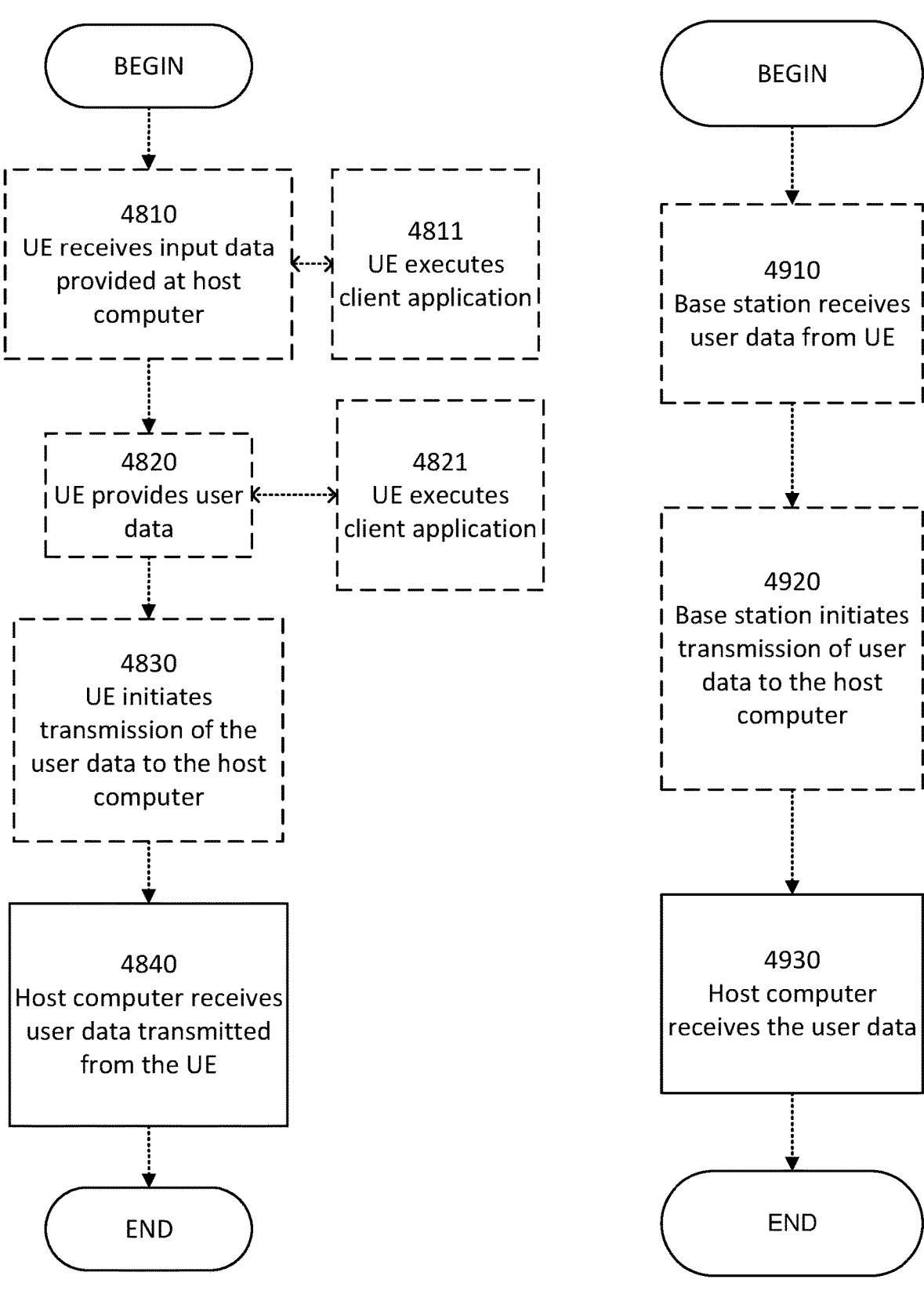
FIG. 23 is a block diagram of methods implemented in a communication system including a host computer, a base station, and a user equipment in accordance with some embodiments.
FIG. 24 is a block diagram of methods implemented in a communication system including a host computer, a base station, and a user equipment in accordance with some embodiments.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 23 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 24 illustrates methods implemented in a communication system including a host computer, a base station and a user equipment in accordance with some embodiments FIG. 24 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 24 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Explanations for abbreviations from the above disclosure are provided below.

| Abbreviation | Explanation |
| --- | --- |
| 1G | $1^{st}$ Generation |
| 2G | $2^{nd}$ Generation |
| 3G | $3^{rd}$ Generation |
| 3GPP | $3^{rd}$ Generation Partnership Project |
| 4G | $4^{th}$ Generation |
| 5G | $5^{th}$ Generation |
| AAA Server | Authentication Authorization and Accounting |
| AIR | Authentication Information Request |
| AMF | Access and Mobility Management Function |
| AUSF | Authentication Server Function |
| CN | Core Network |
| ECIES | Elliptic Curve Integrated Encryption Scheme |
| gNB | Radio Base Station in NR |
| GSM | Global System for Mobile Communication |
| HN | Home Network |
| IMSI | International Mobile Subscriber Identity |
| LTE | Long Term Evolution |
| MAC | Message Authentication Code |
| MCC | Mobile Country Code |
| ME | Mobile Equipment |
| MNC | Mobile Network Code |
| MNO | Mobile Network Operators |
| NAI | Network Access Identifier |
| NAS | Non-Access Stratum |
| NR | New Radio |
| RAN | Radio Access Network |
| RRC | Radio Resource Control |
| RSA | Rivest-Shamir-Adleman |
| SBI | Service Based Interface |
| SEAF | Security Anchor Function |
| SIDF | Subscription Identifier De-concealing Function |
| SN | Serving Network |
| SUCI | Subscription Concealed Identifier |
| SUPI | Subscription Permanent Identifier |
| UDM | Unified Data Management |
| UE | Wireless Device or User Equipment |
| UMTS | Universal Mobile Telecommunications Service |
| USIM | Universal Subscriber Identity Module |

The invention claimed is:

1. A method of operating a user equipment (UE) in a wireless communication network, the method comprising:

generating a padded identifier by inserting a padding bitstring in a field of an identifier associated with the UE, wherein the identifier is a subscription permanent identifier (SUPI), wherein fields of the SUPI comprise at least one of: a mobile subscriber identification number (MSIN), a username, a routing identifier, a public key identifier, or a scheme identifier, wherein generating the padded identifier comprises padding at least one of: the MSIN, the username, the routing identifier, the public key identifier, or the scheme identifier, wherein generating the padded identifier comprises inserting a delimiter before or after the padding bitstring, the delimiter being a predetermined bitstring that separates the padding bitstring from unpadded content of the field of the identifier, wherein the delimiter comprises a first delimiter and a second delimiter, and wherein inserting the delimiter comprises inserting the first delimiter before the padding bitstring and inserting the second delimiter after the padding bitstring;

encrypting the padded identifier to generate a concealed padded identifier; and transmitting the concealed padded identifier to a network node operating in the wireless communication network.

2. The method of claim 1, wherein the UE comprises at least one of a universal subscriber identity module (USIM) and a mobile equipment (ME), wherein the padding bitstring comprises one or more bits, and wherein the concealed padded identifier is a subscription concealed identifier (SUCI).

3. The method of claim 1, wherein transmitting the concealed padded identifier to the network node operating in the wireless communication network comprises transmitting the concealed padded identifier to the network node operating in the wireless communication network during operation by the UE for registration of the UE with the wireless communication network.

4. The method of claim 1, further comprising receiving a request for the identifier from the network node, wherein transmitting the concealed padded identifier to the network node operating in the wireless communication network comprises transmitting the concealed padded identifier to the network node operating in the wireless communication network in response to receiving the request from the network node.

5. The method of claim 1, wherein generating the padded identifier comprises:

receiving padding instructions from the network node, the padding instructions indicating at least one of: a length, a content, or the delimiter usable by the UE to pad the identifier; and padding the identifier based on the padding instructions.

6. The method of claim 1, wherein generating the padded identifier comprises:

receiving padding instructions from a user of the UE via a user interface of the UE, the padding instructions indicating at least one of: a length, a content, or the delimiter usable by the UE to pad the identifier; and padding the identifier based on the padding instructions.

7. The method of claim 1, wherein the wireless communication network comprises a home network and a serving network and the network node comprises a home network node and a serving network node, and wherein transmitting the concealed padded identifier to the network node comprises transmitting the concealed padded identifier to the serving network node to be partially decrypted and further transmitted by the serving network node to the home network node to be further decrypted.

8. A method of operating a network node in a wireless communication network, the method comprising:

determining a padding technique usable by a user equipment (UE) in the wireless communication network to insert a padding bitstring in a field of an identifier associated with the UE prior to the UE encrypting the identifier, wherein the identifier is a subscription permanent identifier (SUPI), wherein fields of the SUPI comprise at least one of: a mobile subscriber identification number (MSIN), a username, a routing identifier, a public key identifier, or a scheme identifier, wherein the padding technique comprises padding at least one of: the MSIN, the username, the routing identifier, the public key identifier, or the scheme identifier, wherein the padding technique comprises inserting a delimiter before or after the padding bitstring, the delimiter being a predetermined bitstring that separates the padding bitstring from unpadded content of the field of the identifier, wherein the delimiter comprises a first delimiter and a second delimiter, and wherein inserting the delimiter comprises inserting the first delimiter before the padding bitstring and inserting the second delimiter after the padding bitstring;

receiving a concealed padded identifier from the UE;

decrypting the concealed padded identifier to generate a padded identifier; and determining content of the identifier separate from the padding bitstring based on the padding technique.

9. The method of claim 8, wherein the UE comprises at least one of a universal subscriber identity module (USIM) and a mobile equipment (ME), wherein the padding bitstring comprises one or more bits, and wherein the concealed padded identifier is a subscription concealed identifier (SUCI).

10. The method of claim 8, wherein determining the padding technique comprises determining the delimiter that is insertable before or after the padding bitstring, the delimiter being a predetermined bitstring that separates the padding bitstring from content of the identifier, and wherein determining the content of the identifier comprises:

identifying the delimiter in the padded identifier; and removing the delimiter and the padding bitstring before or after the delimiter.

11. The method of claim 8, further comprising transmitting, responsive to determining the padding technique and prior to receiving the concealed padded identifier, padding instructions to the UE informing the UE of the padding technique.

12. The method of claim 8, wherein determining the padding technique comprises receiving padding instructions informing the network node of the padding instructions usable by the UE.

13. The method of claim 8, wherein receiving the concealed padded identifier from the UE comprises receiving the concealed padded identifier from the UE as part of a registration request by the UE to join the wireless communication network.

14. The method of claim 8, further comprising transmitting a request to the UE for the identifier, wherein receiving the concealed padded identifier from the UE comprises receiving the concealed padded identifier from the UE in response to transmitting the request to the UE.

15. A user equipment (UE) operating in a wireless communication network comprising:

processing circuitry; and memory coupled to the processing circuitry and having instructions stored therein that are executable by the processing circuitry to cause the UE to perform operations comprising:

generating a padded identifier by inserting a padding bitstring in a field of an identifier associated with the UE, wherein the identifier is a subscription permanent identifier (SUPI), wherein fields of the SUPI comprise at least one of: a mobile subscriber identification number (MSIN), a username, a routing identifier, a public key identifier, or a scheme identifier, wherein generating the padded identifier comprises padding at least one of: the MSIN, the username, the routing identifier, the public key identifier, or the scheme identifier, wherein generating the padded identifier comprises inserting a delimiter before or after the padding bitstring, the delimiter being a predetermined bitstring that separates the padding bitstring from unpadded content of the field of the identifier, wherein the delimiter comprises a first delimiter and a second delimiter, and wherein inserting the delimiter comprises inserting the first delimiter before the padding bitstring and inserting the second delimiter after the padding bitstring;

encrypting the padded identifier to generate a concealed padded identifier; and transmitting the concealed padded identifier to a network node operating in the wireless communication network.

16. A network node operating in a wireless communication network, the network node comprising:

processing circuitry; and memory coupled to the processing circuitry having instructions stored therein that are executable by the processing circuitry to cause the network node to perform operations comprising:

determining a padding technique usable by a user equipment (UE) in the wireless communication network to insert a padding bitstring in a field of an identifier associated with the UE prior to the UE encrypting the identifier, wherein the identifier is a subscription permanent identifier (SUPI), wherein fields of the SUPI comprise at least one of: a mobile subscriber identification number (MSIN), a username, a routing identifier, a public key identifier, or a scheme identifier, wherein the padding technique comprises padding at least one of: the MSIN, the username, the routing identifier, the public key identifier, or the scheme identifier, wherein the padding technique comprises inserting a delimiter before or after the padding bitstring, the delimiter being a predetermined bitstring that separates the padding bitstring from unpadded content of the field of the identifier, wherein the delimiter comprises a first delimiter and a second delimiter, and wherein inserting the delimiter comprises inserting the first delimiter before the padding bitstring and inserting the second delimiter after the padding bitstring;

receiving a concealed padded identifier from the UE;

decrypting the concealed padded identifier to generate a padded identifier; and determining content of the identifier separate from the padding bitstring based on the padding technique.

* * * * *